(12) United States Patent
Miyairi et al.

(10) Patent No.: US 7,581,472 B2
(45) Date of Patent: Sep. 1, 2009

(54) TOOL HOLDER POSITIONING DEVICE

(75) Inventors: Shuji Miyairi, Hanishina-gun (JP); Hiroshi Kuribayashi, Hanishina-gun (JP); Hiroki Nakajima, Hanishina-gun (JP)

(73) Assignee: Alps Tool Co., Ltd., Hanishina-Gun (JP)

(*) Notice: Subject to any disclaimer, the term of this patent is extended or adjusted under 35 U.S.C. 154(b) by 0 days.

(21) Appl. No.: 12/121,051

(22) Filed: May 15, 2008

(65) Prior Publication Data

US 2008/0282861 A1   Nov. 20, 2008

(30) Foreign Application Priority Data

May 16, 2007  (JP)  ............................. P2007-130714
Mar. 17, 2008  (JP)  ............................. P2008-067264

(51) Int. Cl.
*B23B 29/34* (2006.01)
*B23B 29/32* (2006.01)

(52) U.S. Cl. .......................................... 82/121; 82/159

(58) Field of Classification Search ................... 82/121, 82/129, 159, 158, 160, 161; 29/39, 40, 326
See application file for complete search history.

(56) References Cited

U.S. PATENT DOCUMENTS

| | | | |
|---|---|---|---|
| 2,366,050 A * | 12/1944 | Peterson et al. ............... | 29/35.5 |
| 3,726,363 A * | 4/1973 | Sussman ..................... | 184/39.1 |
| 5,820,537 A * | 10/1998 | Zecchetto et al. ............. | 483/55 |
| 5,875,696 A | 3/1999 | Grossman | |
| 5,921,159 A * | 7/1999 | Watkins ........................ | 82/159 |
| 6,513,410 B2 * | 2/2003 | Forst et al. .................... | 82/159 |
| 2006/0196325 A1 | 9/2006 | Shigetsugu | |
| 2009/0133547 A1 * | 5/2009 | Neumeier ..................... | 82/158 |

FOREIGN PATENT DOCUMENTS

| | | |
|---|---|---|
| DE | 10 200 045 662 | 3/2007 |
| EP | 1 671 728 | 6/2006 |
| JP | 2006-167862 | 6/2006 |

* cited by examiner

*Primary Examiner*—Willmon Fridie
(74) *Attorney, Agent, or Firm*—Young & Thompson

(57) ABSTRACT

A tool holder positioning device includes: a plurality of protruded portions or a plurality of recessed portions formed to a seating surface of a tool rest; and a plurality of recessed portions or a plurality of protruded portions formed to a coupling surface of a tool holder so as to correspond, respectively, to a plurality of protruded portions or a plurality of recessed portions formed to the seating surface of the tool rest, when the seating surface and the coupling surface are contacted. At least one of the protruded portions and at least one of the recessed portions are disposed on an intersecting axis included in the seating surface, and the recessed portions and the protruded portions to be fitted to the plurality of protruded portions and the plurality of recessed portions are disposed on an intersecting axis included in the coupling surface. A plurality of slots parallel with the seating surface or coupling surface are alternatively formed in a direction of an axis on which the protruded portions are disposed so that the protruded portions are elastically deformable, and tapered surfaces of the recessed portions and the protruded portions are symmetrically formed thereof, respectively.

10 Claims, 23 Drawing Sheets

TOOL HOLDER POSITIONING DEVICE

BACKGROUND OF THE INVENTION

1. Field of the Invention

The present invention relates to device for mounting and positioning a tool holder to a tool rest such as turret of a machine tool.

2. Related Art

In order to work a workpiece at high precision by a machine tool such as lathe, it is necessary to accurately locate a tool holder with respect to a tool rest such as turret of a lathe. For this purpose, the tool rest of the machine tool is provided with a device for positioning the tool holder (tool holder positioning device).

That is, a seating surface is formed to the tool rest, and a plurality of recessed portions are formed to the seating surface. The tool holder is formed with a coupling surface so as to accord with the seating surface of the tool rest, and the coupling surface is formed with protruded portions so as to be fitted into the recessed portions formed to the tool rest. When the coupling surface of the tool holder abuts against the seating surface of the tool rest and the protruded portions of the coupling surface are fitted into the corresponding recessed portions, the tool holder can be positioned with respect to the tool rest.

In a conventional technology, in order to precisely position the tool holder and the tool rest, the recessed portions and the protruded portions are formed as key grooves and keys, respectively, and these key grooves and keys are formed such that a side surface at which the key contacts the key groove is perpendicular to that of the other key and key groove (for example, refer to Patent Publication 1: Japanese Patent Laid-open Publication No. 2006-167862). Furthermore, the protruded portion is attached to a front portion of a spring piece to position the tool holder on the tool rest, and at the time when the tool holder is fastened to the tool rest by means of screws, the spring piece is flexed (for example, refer Patent Publication 2: German Patent Application Laid-open Publication 102005045662).

In the positioning method using the key and key groove disclosed in the Patent Publication 1, a small gap is generated between side surfaces of the key and the key groove, and because of this reason, there may be a fear of causing a deviation such that the tool holder is not precisely positioned. This deviation is caused in an X-axis direction or a Y-axis direction, or in a twisting direction θ around a Z-axis in view of perpendicularly intersecting X-Y axes and Z-axis perpendicular to the X-Y axes on the seating surface and coupling surface.

Furthermore, a working for fitting the key into the key groove while abutting the coupling surface of the tool holder against the seating surface of the tool rest is troublesome, which results in that the key and the key groove may be easily damaged at the fitting time, thus proving a problem.

In the positioning method disclosed in the Patent Publication 2, when the tool holder is attached, the spring piece supporting the protruded portion in a cantilever manner is flexed, so that the axis of the protruded portion may be inclined, which is at first perpendicular to the coupling surface of the tool holder and the seating surface of the tool rest. Therefore, the positioning of the tool holder may not be precisely performed because of the twisting and contacting of the protruded portion and the recessed portion.

SUMMARY OF THE INVENTION

The present invention was conceived in consideration of the circumstances mentioned above and an object of the present invention is to provide a tool holder positioning device having an improved structure capable of obviating inconveniences encountered in the prior art mentioned above.

The above and other objects can be achieved according to the present invention by providing a tool holder positioning device which includes: a plurality of protruded portions or a plurality of recessed portions formed to a seating surface of a tool rest; and a plurality of recessed portions or a plurality of protruded portions formed to a coupling surface of a tool holder so as to correspond, respectively, to a plurality of protruded portions or a plurality of recessed portions formed to the seating surface of the tool rest, when the seating surface and the coupling surface are contacted, and in which the protruded portions and the recessed portions have tapered surfaces which are symmetric with each other so as to slidably contact to each other when the seating surface and the coupling surface are tightly contacted, wherein at least one of the protruded portions and at least one of the recessed portions are disposed on intersecting axes included in the seating surface, the recessed portions and the protruded portions to be fitted to the plurality of protruded portions and the plurality of recessed portions are disposed on intersecting axes included in the coupling surface, a plurality of slots parallel with the seating surface or coupling surface are alternatively formed in a direction of an axis on which the protruded portions are disposed so that the protruded portions are elastically deformable in a vertical direction with respect to the seating surface or coupling surface, and the tapered surfaces of the recessed portions and the protruded portions are symmetric with respect to the axes on which the respective recessed portions and the protruded portions are disposed.

It is therefore possible to fit the protruded portions into the recessed portions by opposing the tapered surfaces of the protruded portions and the recessed portions, respectively, to thereby positively prevent the protruded portions and the recessed portions from being damaged. In addition, since the protruded portion is elastically deformable in a direction perpendicular to the seating surface or coupling surface, when the protruded portion is fitted into the recessed portion, the tapered surfaces thereof are smoothly contacted to each other and the seating surface and the coupling surface can be hence precisely tightly contacted. Furthermore, when the coupling surface of the tool holder is coupled with the seating surface of the tool rest, the two axes intersecting at right angle can be accorded with each other so as not to shift in a circumferential direction of the axis perpendicular to the intersecting two axes, and accordingly, the tool holder can be accurately positioned with respect to the tool rest.

In a preferred embodiment, each of the protruded portions may be formed so as to have substantially cubic shape or rectangular parallelepiped shape. In this embodiment, the tapered surfaces of the protruded portion and the recessed portion can be widely formed.

Furthermore, each of the protruded portions may be formed so as to have a circular-truncated cone shape. In this embodiment, the protruded portion can be easily and precisely formed.

Still furthermore, all the protruded portions may be coupled integrally by a coupling member. In this embodiment, the protruded portions can be easily and precisely mounted to the tool holder or tool rest.

Still furthermore, the recessed portions may be grooves extending along the respective axes. In this embodiment, the recessed portion can be easily formed.

Still furthermore, each of the recessed portions may be formed as a female hole which is fitted to the corresponding protruded portion. In this embodiment, the recessed portion can be easily and precisely formed.

Still furthermore, the intersecting axes may be two axes intersecting at right angle. In this embodiment, the recessed portions and the protruded portions can be precisely mated in positions.

Still furthermore, the intersecting axes may be formed so as to intersect a perpendicular axis or horizontal axis included in the seating surface or coupling surface. In this embodiment, as shown in FIG. 19, as later mentioned, when the tool holder is disposed to be horizontal and mounted to the seating surface of the tool rest, the weights of the tool holder are shared to the respective protruded portions or recessed portions disposed so as to snap the vertical axis as shown in FIG. 16, as later mentioned, so that the mounting performance of the tool holder can be further enhanced.

Still furthermore, a fastening bolt for fastening the tool holder to the seating surface of the tool rest may be disposed on or near the intersecting axes. In this embodiment, the protruded portions can be deformed precisely in the vertical direction with respect to the seating surface or coupling surface, and accordingly, the mounting performance of the tool holder can be further enhanced.

Still furthermore, all the protruded portions and recessed portions are formed as annular members, and the annular members are fitted into and fixed to annular grooves formed respectively to the seating surfaces or coupling surface so as to surround the tool holder. In this embodiment, the mounting performance of the protruded portions or recessed portions with respect to the seating surface or coupling surface can be enhanced, and hence, the positioning performance of the tool holder with respect to the tool rest can be improved.

The nature and further characteristic features of the present invention will be made clearer from the following descriptions made with reference to the accompanying drawings.

DESCRIPTION OF THE PREFERRED EMBODIMENTS

Preferred embodiments of the present invention will be described hereunder with reference to the accompanying drawings.

First Embodiment

Figure 1:
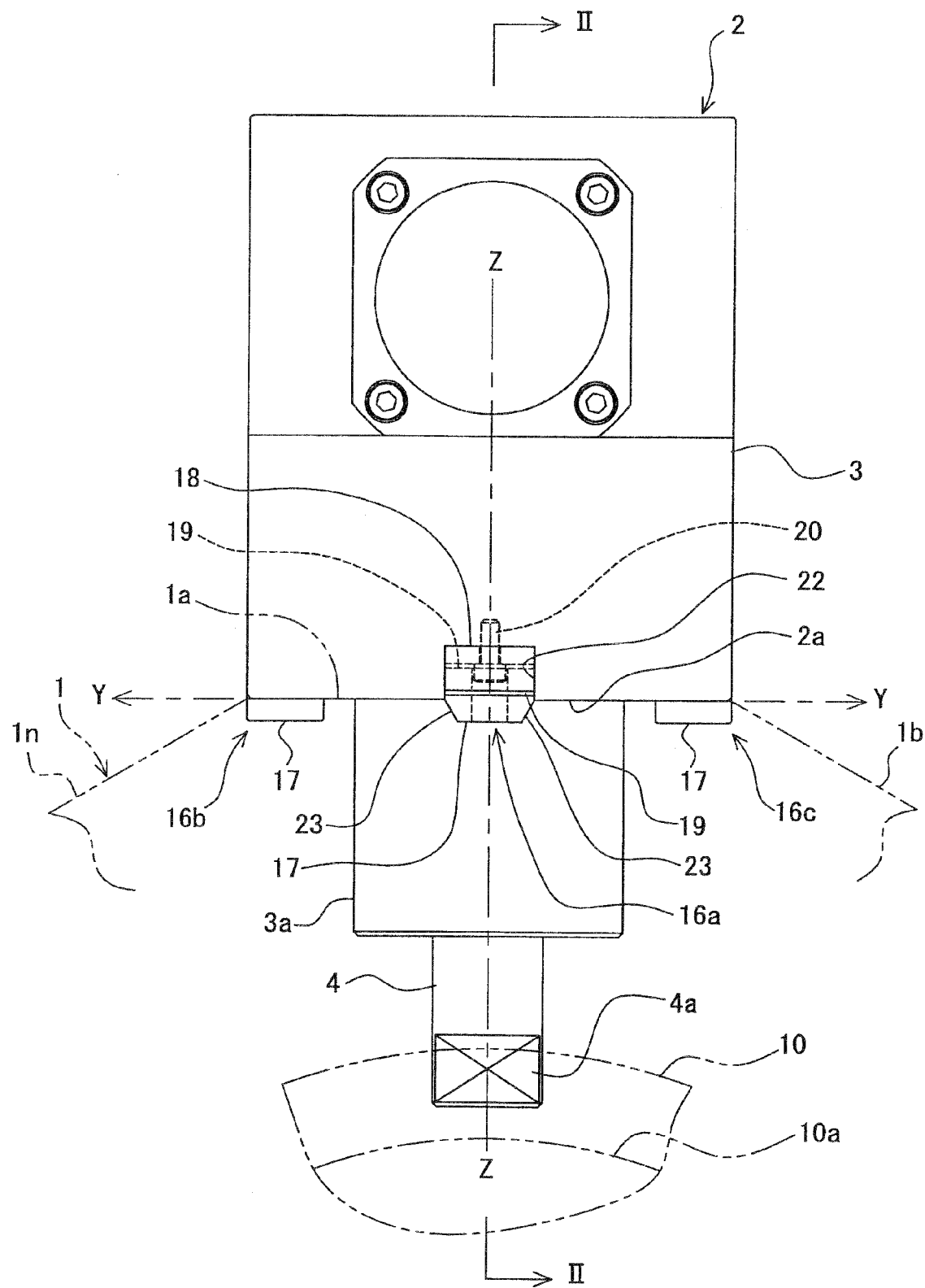
FIG. 1 is a back-side view of a tool holder positioning device according to a first embodiment of the present invention when viewed from a back surface side of a tool holder.

A machine tool discussed herein is a turret lathe, and as shown in FIGS. 1 to 6, the lathe is provided with a turret 1 as a tool rest. A tool holder 2 is fixed to the turret 1 in a manner such that a plurality of seating surfaces $1a$, $1b$, - - -, $1n$ of the turret 1 are mated with a coupling surface $2a$ of the tool holder 2. In this connection, the tool holder 2 shown in FIG. 1 is one example of existing tool holders, which are mounted to an optional seating surface $1a$ of the turret 1 with other tool holders holding various tools.

Figure 2:
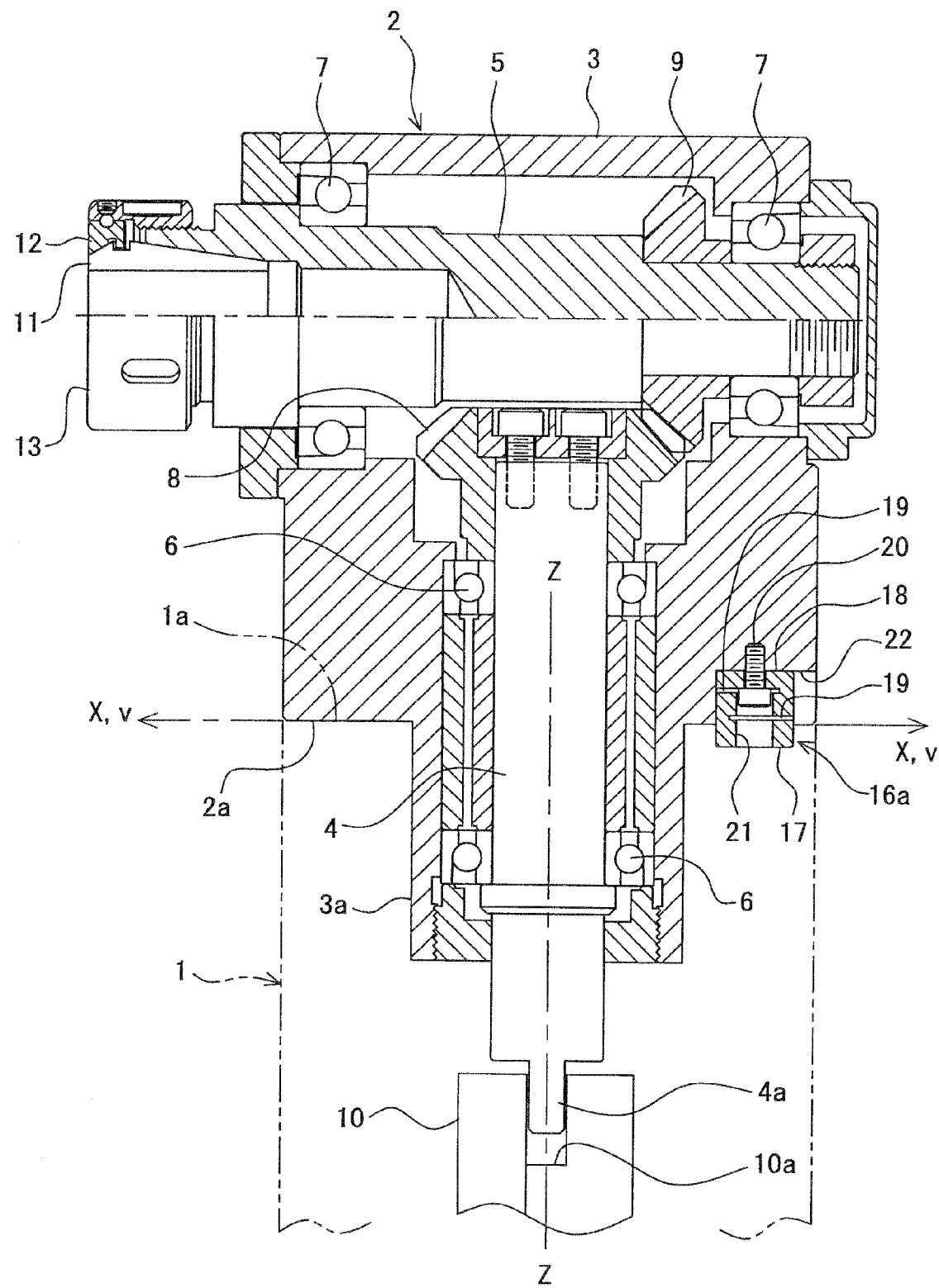
FIG. 2 is a sectional view taken along the line II-II in FIG. 1.
Figure 3:
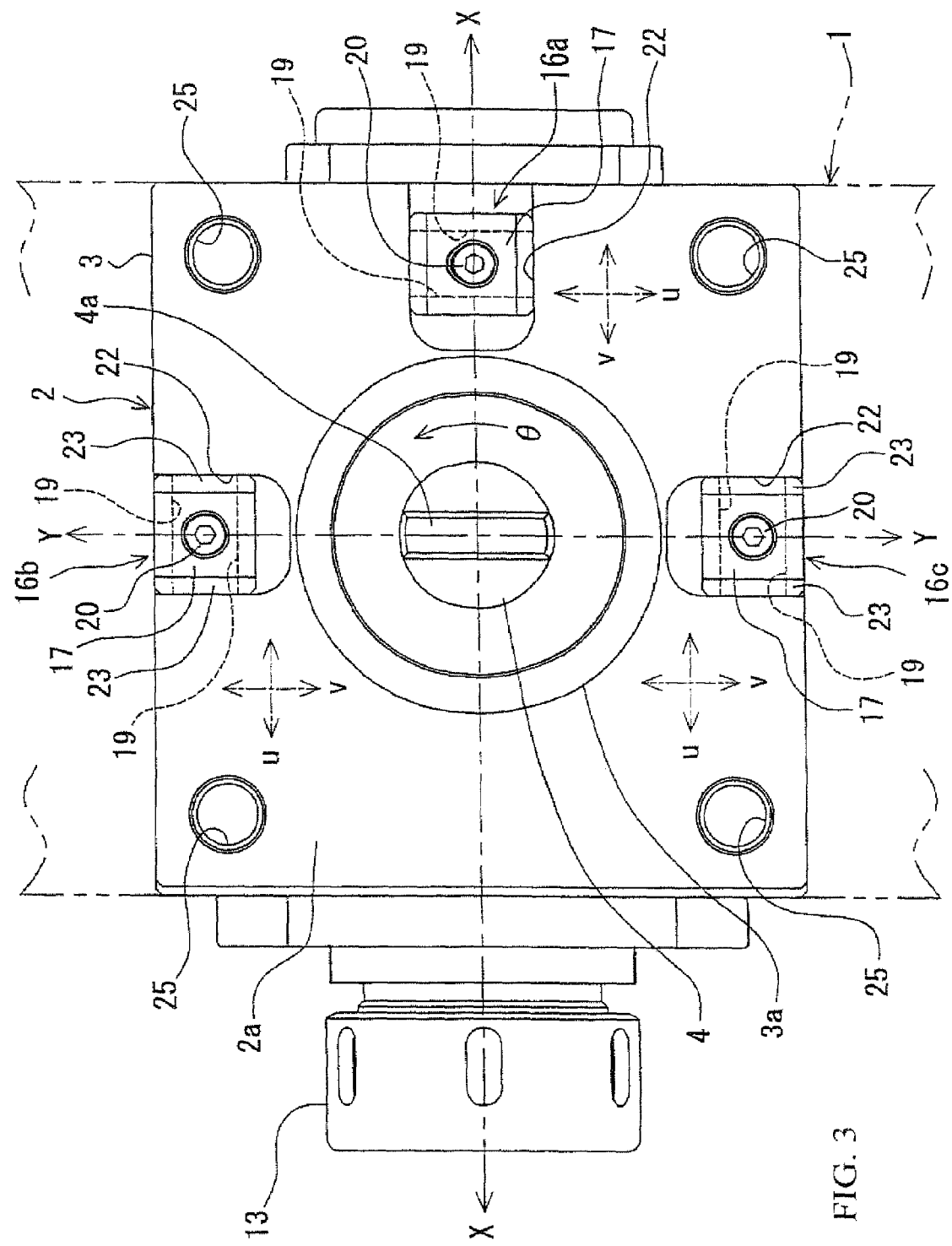
FIG. 3 is a bottom-side view of the tool holder positioning device when viewed from the bottom side of the tool holder.

The tool holder 2 shown in FIGS. 1 to 3 has a housing 3, which includes a transmission shaft 4 receiving a power from the lathe side and a spindle 5 as a main shaft to which the power is transmitted through the transmission shaft 4. The transmission shaft 4 and the spindle 5 are arranged such that central axes thereof are perpendicularly crossing each other, and they are supported rotatably to the housing 3 through bearings 6 and 7, respectively.

One end of the transmission shaft 4 projects over the housing 3, and a parallel key 4a is formed to the projecting portion so as to be coupled with a driving shaft, not shown, of the lathe side. The other end of the transmission shaft 4 disposed inside the housing 3 is fixedly mounted with a first bevel gear 8.

One end of the spindle 5 projects over the housing 3, and a chuck, not shown, for detachably holding a tool is formed to the projecting portion. The other end of the spindle 5 inside the housing 3 is fixedly mounted with a second bevel gear 9 meshed with the first bevel gear 8.

The parallel key 4a formed to the one end of the transmission shaft 4 is fitted into a groove 10a formed to an annular rail 10 fixed to a frame side of the lathe in the turret 1 to be slidable. When the turret 1 is turned, the tool holder 2 is moved together with the other tool holders, and the parallel keys 4a of the respective tool holders are slid inside the grooves 10a of the rails 10. The rail 10 is interrupted at a driving position, and the parallel key 4a of the predetermined tool holder is removed from the groove 10a of the rail 10 and coupled with the driving shaft, not shown, on the lathe side. When the driving shaft is rotated, the rotating motion is transmitted from the transmission shaft 4 to the spindle 5 and a tool, not shown, held by the chuck of the spindle 5 works a workpiece.

The chuck is provided with a collet 11 accommodated in a cavity of the spindle 5, a retainer 12 disposed so as to cover a tapered surface of the front end side of the collet 11, and a tool fastening nut 13 disposed so as to cover and straddle the retainer 12 and the collet 11 and coupled through balls and screw-engaged with the collet 11.

When a shank of the tool, no shown, is inserted into the collet 11 from the front end side of the spindle 5 and the tool fastening nut 13 is turned in the fastening direction, the collet 11 is squeezed so as to reduce its diameter through the retainer 12, and the shank of the tool is fastened and then fixed. Reversely, when the tool fastening nut 13 is rotated in its loosening direction, the collet 11 is released from the retainer 12 in a diameter-increasing direction, and the shank of the tool is loosened and then released.

As mentioned above, by rotating rightward or leftward the tool fastening nut 13, the tool is clamped by the chuck of the spindle 5 or unclamped therefrom.

Figure 6:
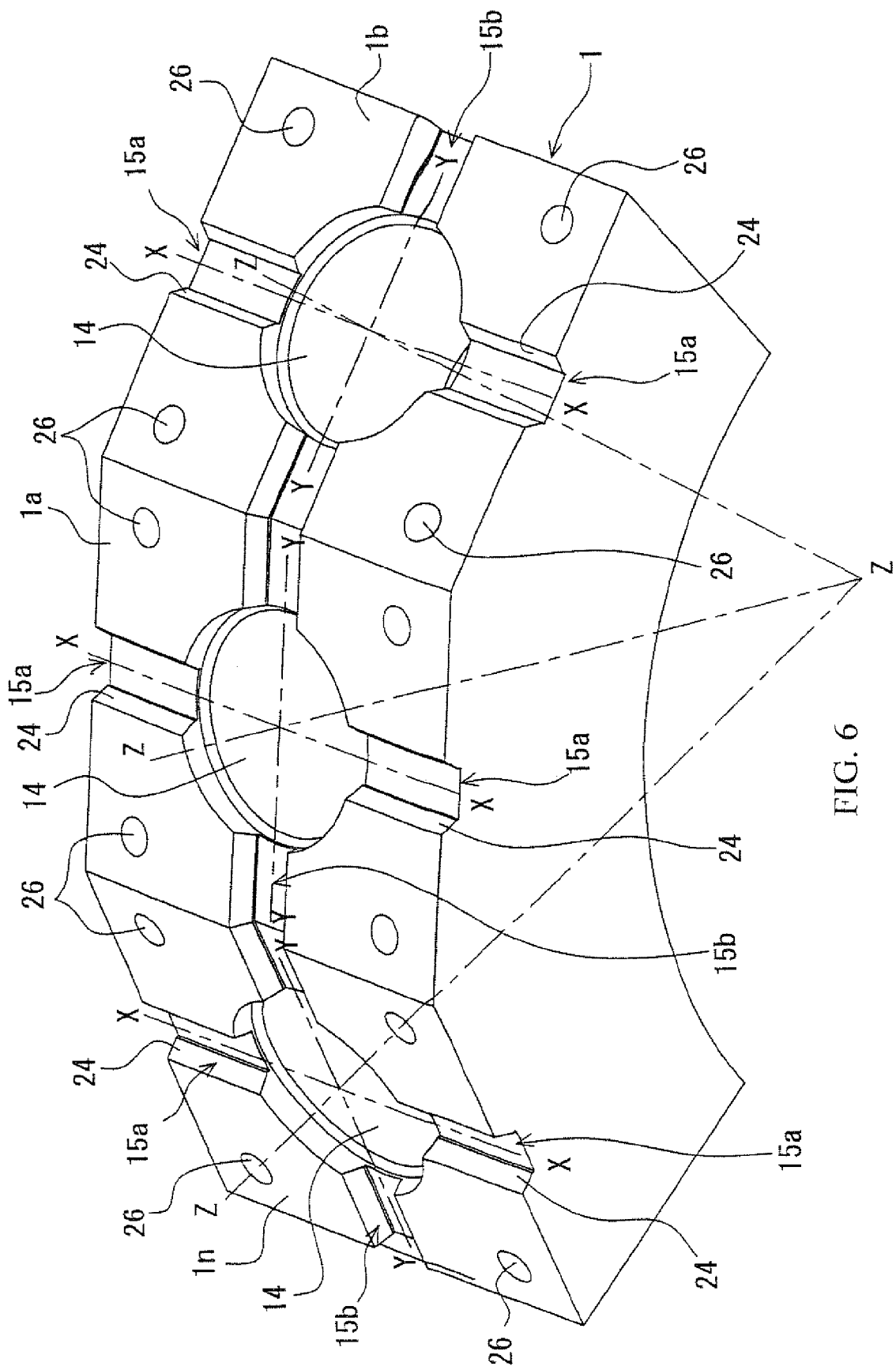
FIG. 6 is a partially cut-away perspective view, in an enlarged scale, of a turret for mounting the tool holder shown in FIG. 1.

Further, as shown in FIG. 6, the turret 1 is formed so as to provide a regular polygonal column shape having a peripheral surface on which a plurality of seating surfaces 1a, 1b, - - - , 1n are formed. The respective seating surfaces 1a, 1b, - - - , 1n are formed with insertion holes 14 into which shank portions 3a of the tool holders 2 are inserted. The shank portion 3a is a cylindrical member projecting from the housing 3 so as to surround the transmission shaft 4.

The turret-type lathe mentioned hereinbefore is provided with a tool holder positioning device for accurately positioning the tool holder 2 on the turret 1.

The tool holder positioning device includes, as shown in FIGS. 1 to 6, a plurality of recessed portions 15a, 15b formed to the respective seating surfaces 1a, 1b, - - - , 1n of the turret 1 as the tool rest, and a plurality of protruded portions 16a, 16b, 16c formed on the coupling surface 2a of the tool holder 2 mating with the desired seating surfaces 1a, 1b, - - - , or 1n so as to be fitted into the recessed portions 15a, 15b.

The recessed portions 15a, 15b are formed, as shown in FIG. 6, as grooves, to the seating surfaces 1a, 1b, - - - , 1n of the turret 1, and these grooves are formed so as to face the protruded portions 16a, 16b, 16c.

The protruded portions 16a, 16b, 16c are formed, as shown in FIGS. 4, 5A, 5B, and 5C, in approximately a cubic shape or rectangular parallelepiped shape, and a front end surface 17 and a base end surface 18 are formed to be parallel. In consideration of three mutually perpendicular axes of u-axis, v-axis and w-axis which are parallel with perpendicular three sides of the cube or rectangular parallelepiped, the front end surface 17 and the base end surface 18 are formed to be parallel with the u- and v-axes, and a pair of opposing side surfaces are formed to be parallel with the v- and w-axes, respectively.

To the respective protruded portions 16a, 16b, 16c, a plurality of slots 19 are alternately cut in so as to be parallel with the seating surfaces 1a, 1b, - - - , 1n or the coupling surface 2a of the tool holder 2 assigned to these seating surfaces. More specifically, the slots 19 are formed so as to extend from one of the side surfaces parallel with the w-u surface toward the other one side surface so as to be parallel with the u-v surface in the alternating form. In the illustrated example, although two slots 19, 19 are formed, three or more than three slots may be formed.

Figure 7A:
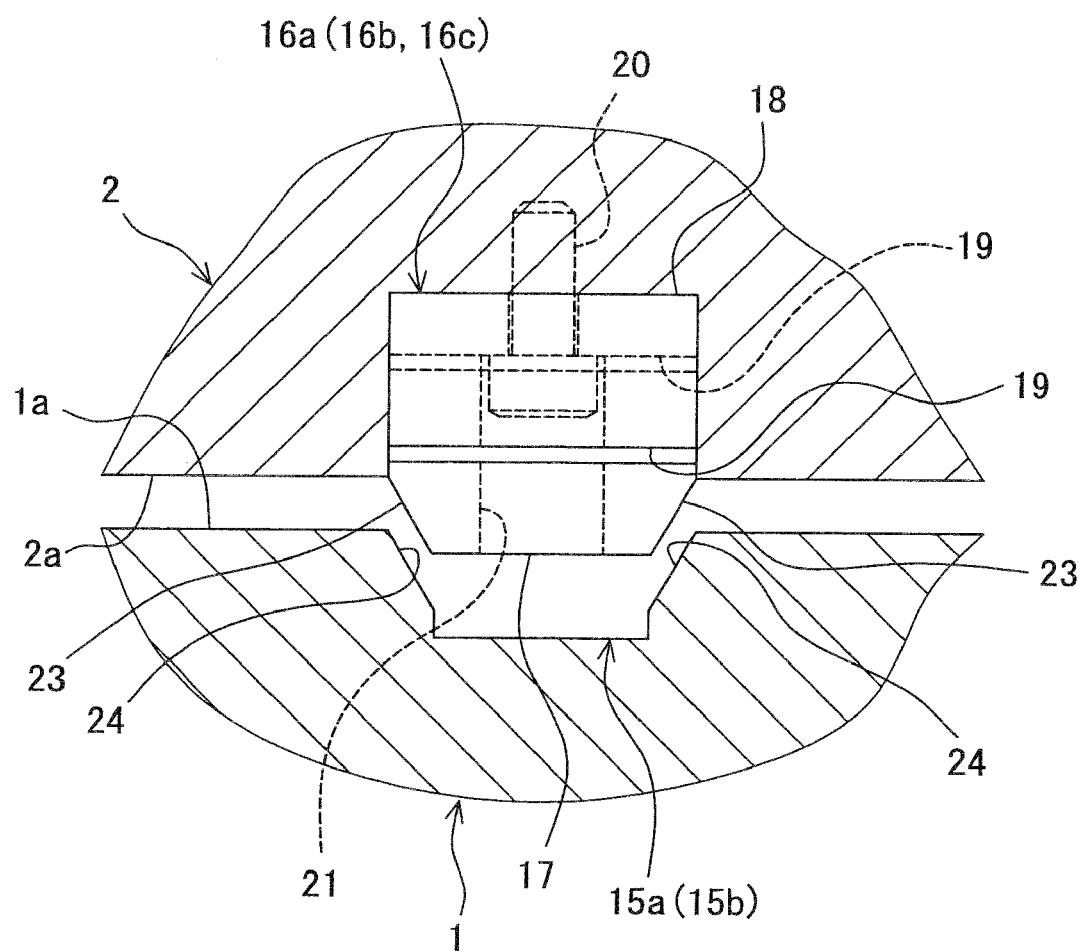
FIG. 7A is a partially cut-away sectional view, in an enlarged scale, showing a condition that the tool holder is fitted to the turret.
Figure 7B:
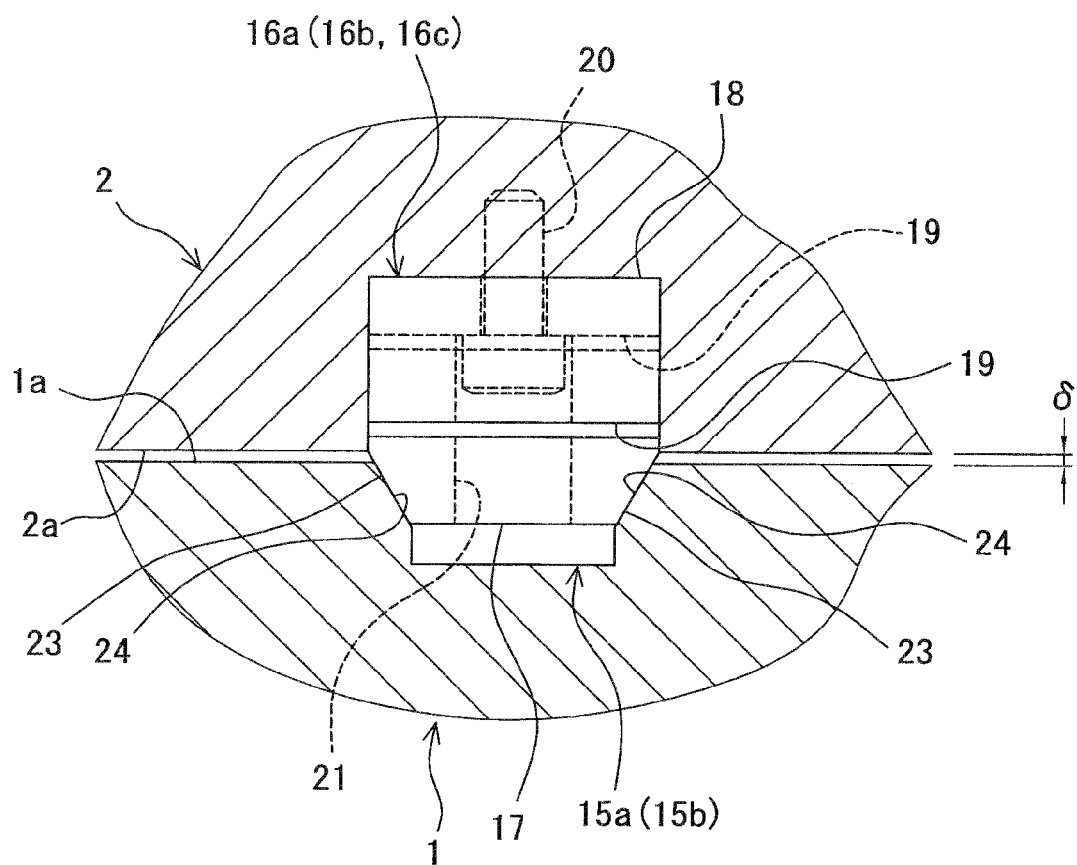
FIG. 7B is a partially cut-away sectional view, in an enlarged scale, showing a condition that a tapered surface of the protruded portion of the tool holder contacts a tapered surface of a recessed portion of the turret.
Figure 7C:
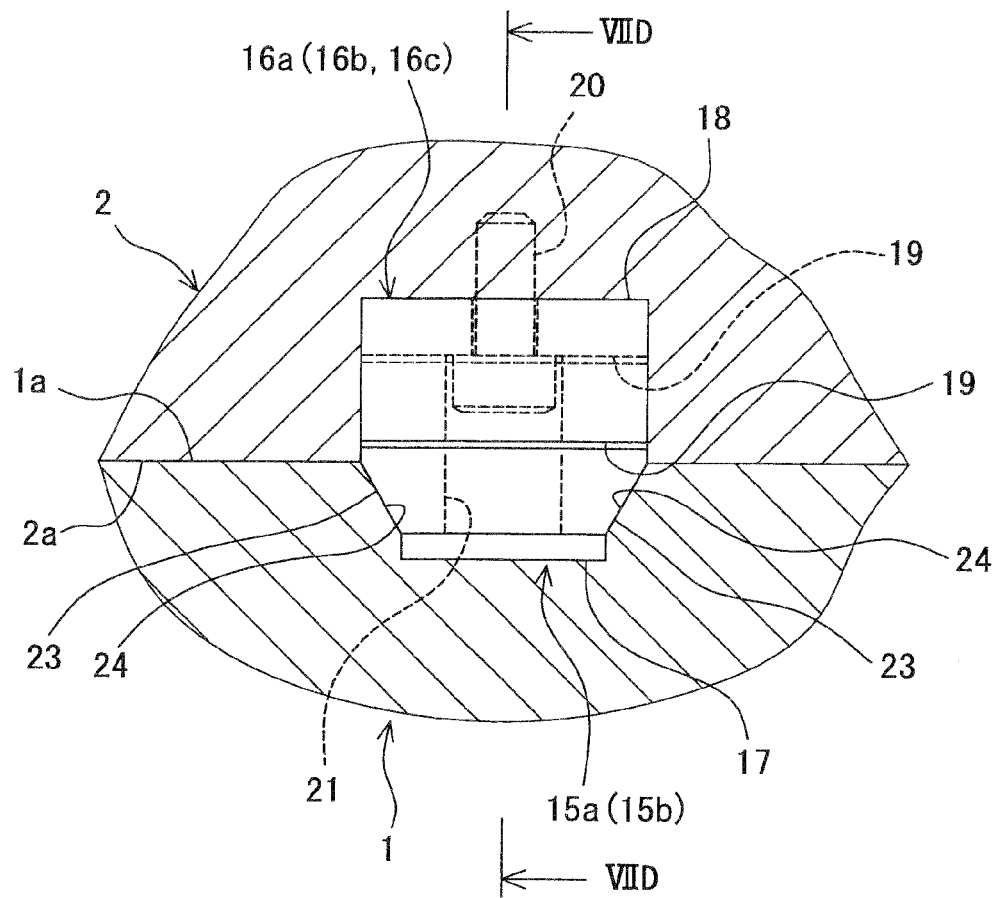
FIG. 7C is a partially cut-a-way sectional view, in an enlarged scale, showing a condition that the coupling surface of the tool holder tightly contacts the seating surface of the turret to thereby complete the positioning of the tool holder.

As mentioned, by alternately forming the plural slots 19, as shown in FIGS. 7A, 7B and 7C, when the protruded portions 16a, 16b and 16c are compressed vertically along the w-axis, the protruded portions become elastically deformable in the w-axis direction.

Figure 5A:
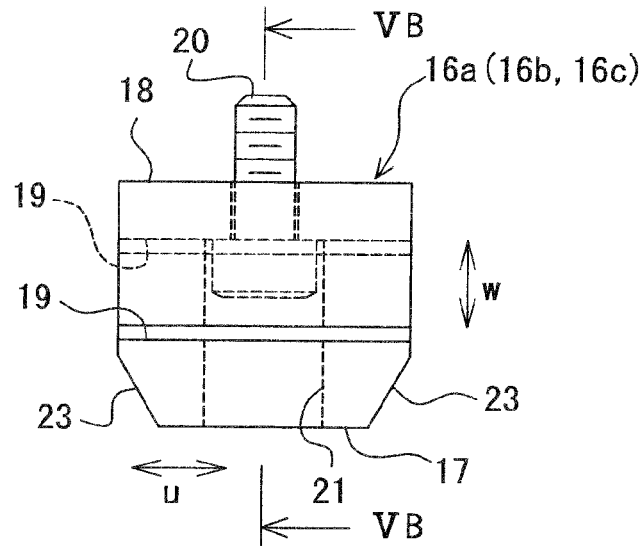
FIG. 5A is a front view of the protruded portion shown in FIG. 4.
Figure 5B:
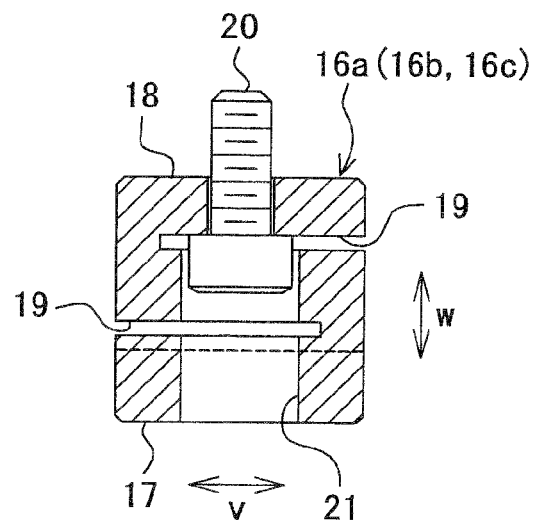
FIG. 5B is a sectional view taken along the line VB-VB in FIG. 5A
Figure 5C:
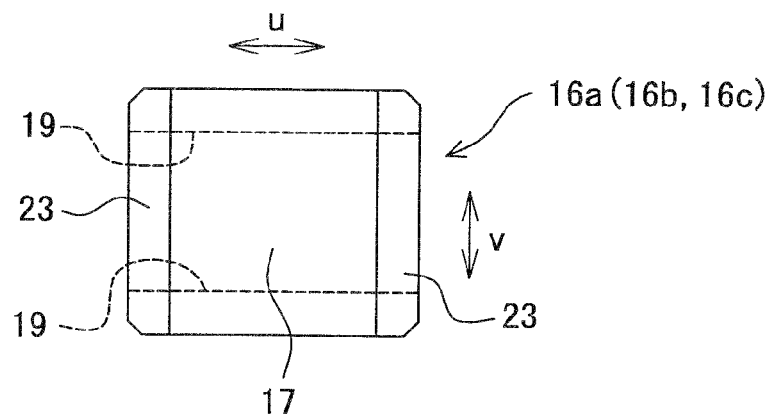
FIG. 5C is a bottom-side view of the protruded portion.

As shown in FIGS. 5A and 5B, the respective protruded portions 16a, 16b, 16c are formed with through holes 21, through which fastening screws 20 are fitted. Each of the holes 21 has a large diameter portion through which a screw head entirely extends through the slot 19 from the front end surface 17 side and a small diameter portion through which a screw shank portion penetrates the base end surface side.

As shown in FIGS. 1 to 3, the respective protruded portions 16a, 16b, 16c are inserted, from the base end surface 18 side, into the recessed portions 22 formed to plural portions of the coupling surface 2a of the tool holder 2, and when the fastening screws 20 are screw-engaged with the housing 3 of the tool holder 2, the protruded portions are fixed to the coupling surface 2a of the tool holder 2.

As shown in FIGS. 1 to 3, a pair of side surfaces parallel with the v-w surface of the protruded portions 16a, 16b, 16c abut against the side surfaces of the recessed portions 22. Therefore, when the vertical compression force is applied to the protruded portions 16a, 16b, 16c, they becomes deformable in the w-axis direction along the side surfaces of the recessed portions 22.

As mentioned above, by fixing the respective protruded portions 16a, 16b, 16c to the coupling surface 2a of the tool holder 2, it makes possible to elastically deform these protruded portions 16a, 16b, 16c linearly in a direction perpendicular to the coupling surface 2a of the tool holder 2 and the seating surface 1a of the turret 1 at the time of fitting the protruded portions into the recessed portions 15a, 15b. In the thus mentioned manner, the protruded portions 16a, 16b, 16c can be smoothly fitted into the recessed portions 15a, 15b, respectively.

Figure 4:
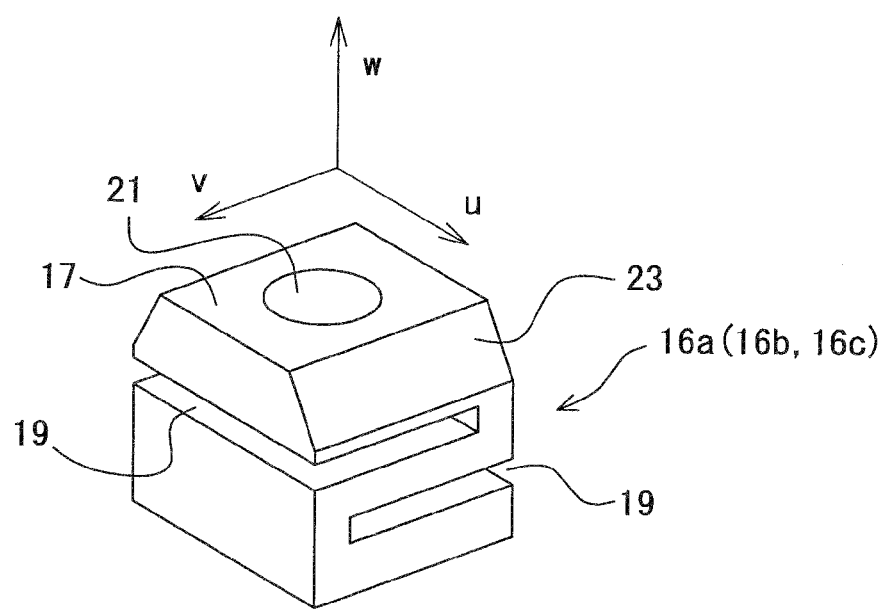
FIG. 4 is a perspective view showing a protruded portion of the tool holder positioning device.

Furthermore, as shown in FIGS. 1, 4 and 6, the respective protruded portions 16a, 16b, 16c and recessed portions 15a, 15b are formed with tapered surfaces which are mated with each other. More specifically, the tapered surfaces 23 of the protruded portions 16a, 16b, 16c are formed to the boundary portions between the front end surface 17 and the two side surfaces parallel with the v-w surface, and the tapered surfaces 24 of the recessed portions 15a, 15b are formed to the boundary portions between the seating surface 1a and the side surfaces forming the recessed portions 15a, 15b.

As shown in FIG. 7A, when the coupling surface 2a of the tool holder 2 approaches the seating surface 1a of the turret 1, since the protruded portions 16a, 16b, 16c and the recessed portions 15a, 15b are opposed to each other through the tapered surfaces 24 and 23, these protruded portions and recessed portions can be easily fitted together, thereby preventing them from being damaged.

Further, as shown in FIG. 7B, the tapered surfaces 23 and 24 of these protruded portions 16a, 16b, 16c and the recessed portions 15a, 15b are contacted to each other and a small gap δ is formed between the coupling surface 2a and the seating surface 1a. Then, the fastening bolts, not shown, are inserted into the through holes 25 formed to the housing 3 of the tool holder 2 shown in FIG. 3, and then screw-fitted into the screw holes 26 of the turret 1 shown in FIG. 6.

Figure 7D:
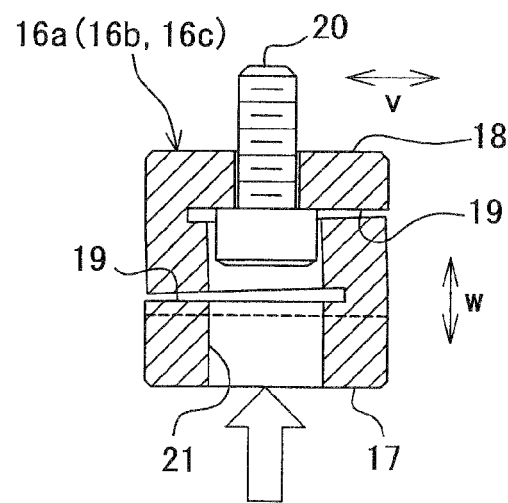
FIG. 7D is a sectional view taken along the line VIID-VIID in FIG. 7C.
Figure 8:
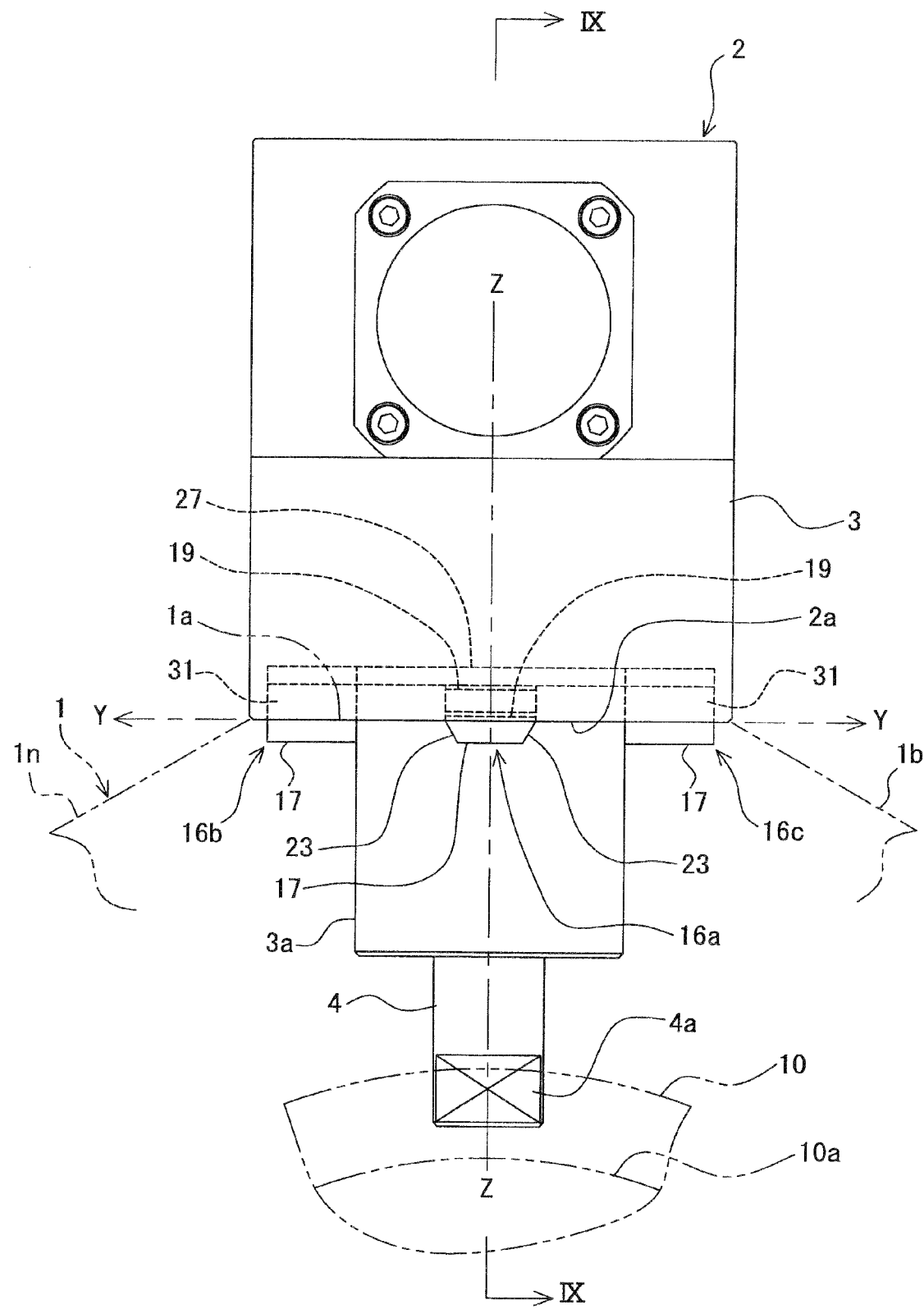
FIG. 8 is a back-side view of a tool holder positioning device according to a second embodiment of the present invention when viewed from a back surface side of a tool holder.

In this operation, as shown in FIGS. 7C and 7D, the protruded portions 16a, 16b, 16c are linearly elastically deformed in the Z-axis direction perpendicular to the coupling surface 2a and the seating surface 1a, and both the tapered surfaces 23 and 24 of the protruded portions 16a, 16b, 16c and the recessed portions 15a, 15b slide each other. In thus manner, the coupling surface 2a of the tool holder 2 contacts smoothly with respect to the seating surface 1a of the turret 1.

Then, as shown in FIG. 3, the protruded portions 16a, 16b, 16c are formed on two axes (X- and Y-axes) intersecting at right angles included on the coupling surface 2a of the tool holder 2, in which the X-axis is parallel with the spindle shaft 5. Furthermore, the Z-axis perpendicular to the X- and Y-axes passes through the axial center of the transmission shaft 4 perpendicular to the spindle shaft 5.

In the embodiment illustrated in FIG. 3, although the two protruded portions are provided on the Y-axis, only one protruded portion may be provided thereon, or two protruded portions may be provided on the X-axis.

Furthermore, the protruded portions 16a, 16b, 16c are fixed on the coupling surface 2a in a state such that the slots 19 are formed in the X- or Y-axis direction on which the protruded portions 16a, 16b, 16c are placed. As shown in FIG. 4, since the protruded portions 16a, 16b, 16c show their high rigidity in the u-direction than in the v-direction, by setting the cut direction of the slots 19 in the X-axis or Y-axis direction on which the protruded portions 16a, 16b, 16c are placed, it is difficult to deform the protruded portion 16a on the X-axis to the Y-axis direction and also difficult to deform the protruded portions 16b, 16c on the Y-axis to the X-axis direction.

On the other hand, the recessed portions 15a, 15b are provided on the X- and Y-axes which mutually intersect at right angle included in the respective seating surfaces 1a, 1b, - - - , 1n of the turret 1, as shown in FIG. 6. Further, the tapered surfaces 24 and 23 of the respective recessed and protruded portions 15a, 15b and 16a, 16b, 16c are formed symmetrically with respect to the X- and Y-axes on which the tapered surfaces 24 and 23 are placed.

According to such arrangement, when the protruded portions 16a, 16b, 16c are fitted to the recessed portions 15a, 15b, the respective protruded portions 16a, 16b, 16c are restricted by two surfaces snapping the X- or Y-axis, and the X- and Y-axes included in the coupling surface 2a is not twisted in the θ-direction around the Z-axis and accord with the X- and Y-axes of the seating surfaces 1a, 1b, - - - , 1n, thus positioning the tool holder 2 to the turret 1 at high precision.

Next, the function of the tool holder positioning device will be described hereunder.

(1) The shank portion 3a of the tool holder 2 is inserted into the insertion hole 14 at the desired seating surface 1a of the turret 1, and the coupling surface 2a of the tool holder 2 is placed so as to face the desired seating surface 1a.

(2) As shown in FIG. 7A, the protruded portions 16a, 16b, 16c protruding from the coupling surface 2a are inserted into the recessed portions 15a, 15b formed to the seating surface 1a. According to this insertion, as shown in FIG. 7B, the tapered surfaces 24 and 23 of the protruded portions 16a, 16b, 16c and the recessed portions 15a, 15b are contacted, and the slight gap δ is formed between the coupling surface 2a and the seating surface 1a.

(3) Then, fastening bolt, not shown, is inserted into through hole 25 of the housing 3 of the tool holder 2 shown in FIG. 3 and is screwed into the screw hole 26 of the turret 1. Then, as shown in FIGS. 7C and 7D, the protruding portions 16a, 16b, 16c are linearly elastically deformed in the Z-axis direction perpendicular to the coupling surface 2a and the seating surface 1a, the tapered surfaces 23 and 24 of both the protruded portions and recessed portions 16a, 16b, 16c and 15a, 15b are slidably contacted to each other, and the coupling surface 2a of the tool holder 2 tightly contacts smoothly the seating surface 1a of the turret 1 to be slidable.

Further, the protruded portions 16a, 16b, 16c are fixed to the coupling surface 2a so as to have a state in which the slots 19 are cut in the X- or Y-axis direction on which the protruded portions 16a, 16b, 16c are placed. Accordingly, the protruded portions 16a on the X-axis is hard to be deformed in the Y-axis direction and the protruded portions 16b, 16c on the Y-axis are hard to be deformed in the X-axis direction. Thus, when the protruded portions 16a, 16b, 16c are fitted into the recessed portions 15a, 15b, the X- and Y-axes of the coupling surface 2a are not twisted in the θ-direction around the Z-axis and precisely accord with the X- and Y-axes of the seating surface 1a.

Thus, the tool holder 2 is fixed to the turret 1 in the manner of being positioned at high precision.

(4) Further, the cutting tool may be protruded in an opposite side of the turret 1 by fixing the tool holder 2 to the turret 1 so that the spindle 5 is directed oppositely on the X-axis.

(5) At the same time of placing the coupling surface 2a of the tool holder 2 on the seating surface 1a of the turret 1, as shown in FIG. 2, the parallel key 4a of one end of the transmission shaft 4 is fitted to be slidable into the groove 10a of the annular rail 10 fixed to a frame side of the lathe within the turret 1.

(6) When the turret 1 is turned, the tool holder 2 is moved together with other tool holders, not shown, and the parallel keys 4a of the respective tool holders slide in the groove 10a of the rail 10. The rail 10 is cut away at the driving position, and the parallel key 4a of the desired tool holder 2 is disengaged from the groove 10a of the rail 10 and coupled with the driving shaft, not shown, on the lathe side. When the driving shaft is rotated, the rotation is transmitted to the spindle 5 through the transmission shaft 4, and the workpiece is worked by a cutting tool, not shown, held by the chuck of the spindle 5.

Second Embodiment

In this second embodiment, as shown in FIGS. 8 to 11, all the protruded portions 16a, 16b, 16c are connected and integrated together by a coupling member 27.

Figure 11A:
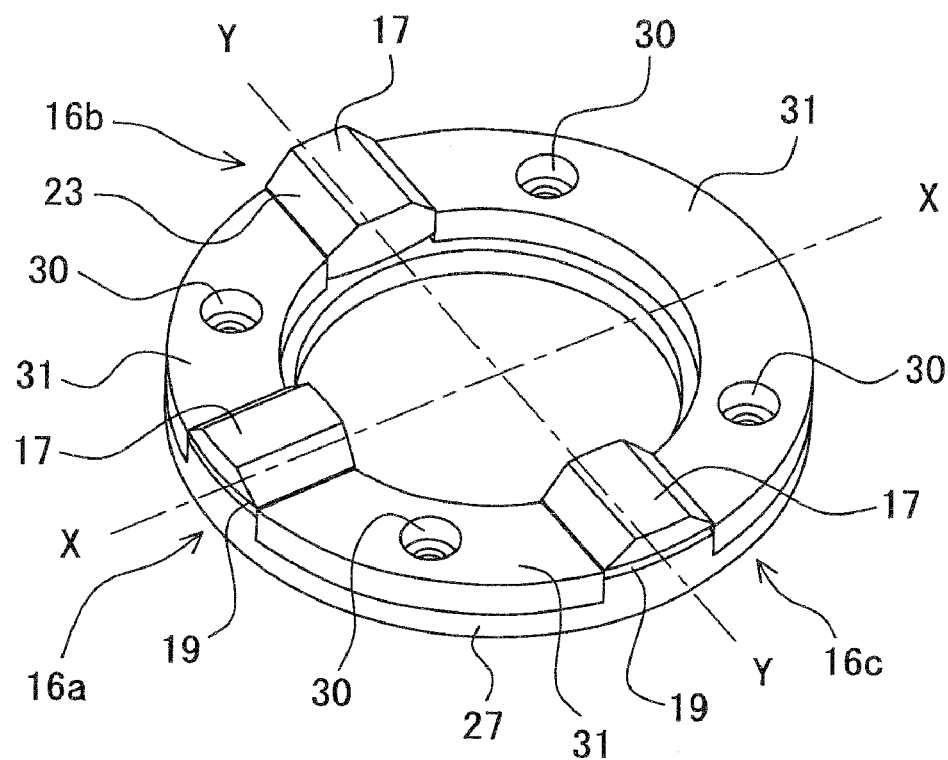
FIG. 11A is a perspective view showing the coupling surface portion on which a plurality of protruded portions are formed.
Figure 11B:
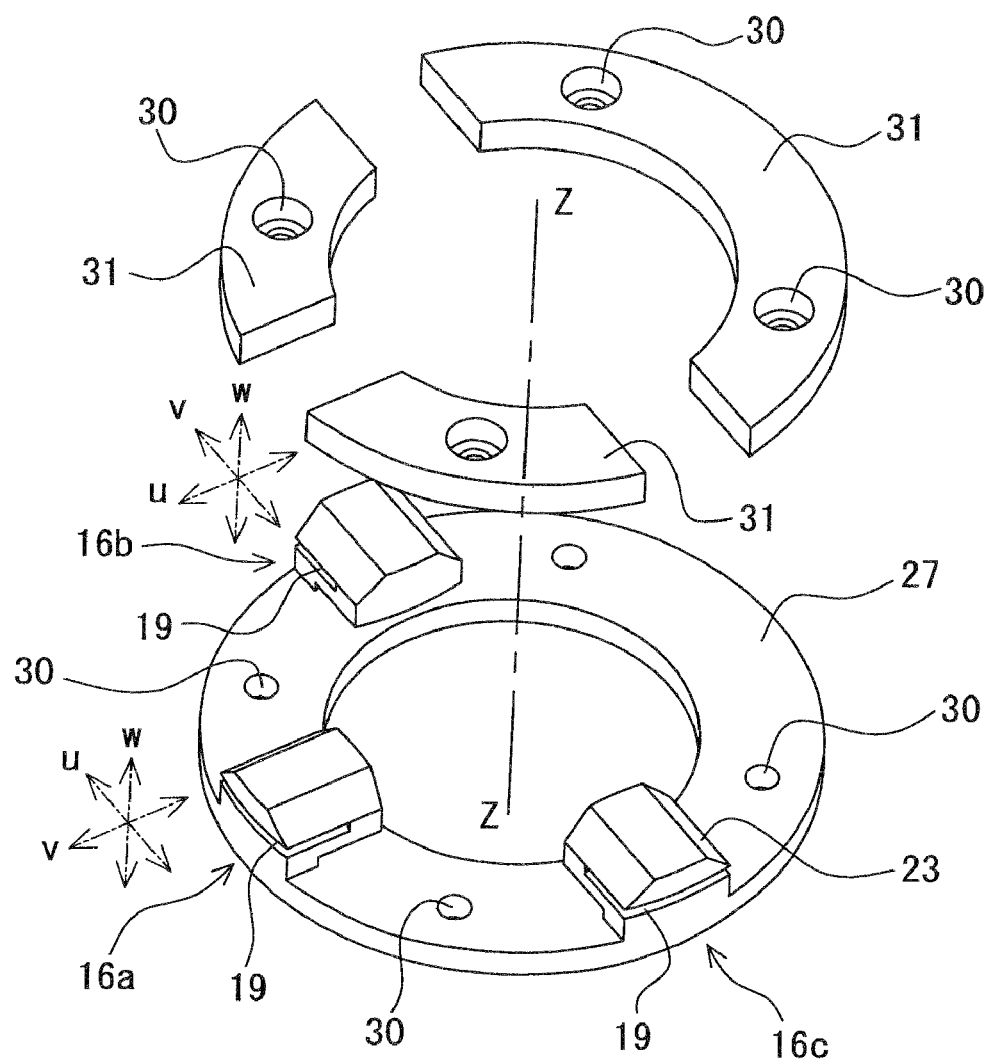
FIG. 11B is a developed perspective view of the coupling surface portion shown in FIG. 11A.
Figure 12:
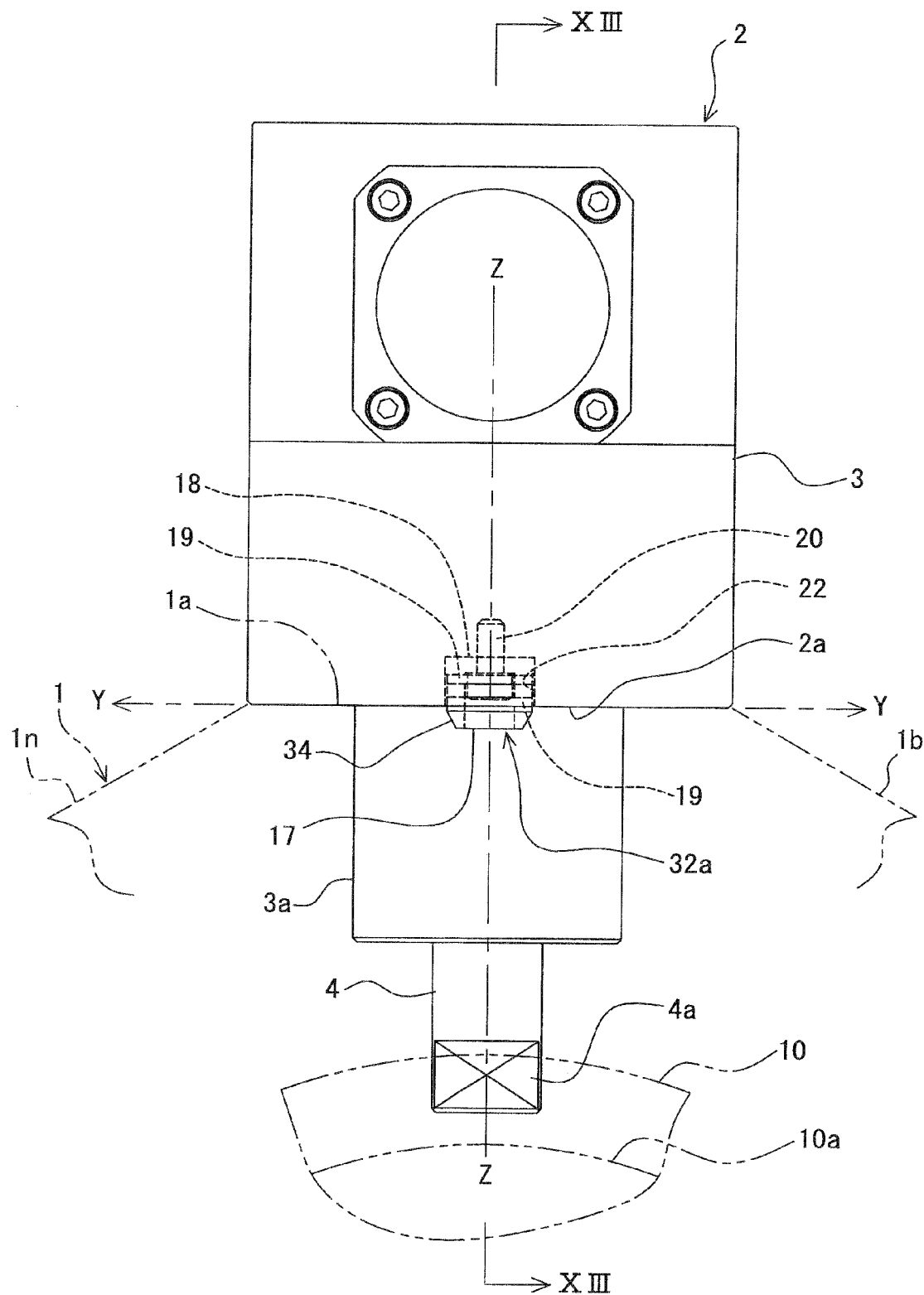
FIG. 12 is a back-side view of a tool holder positioning device according to a third embodiment of the present invention when viewed from a back surface side of a tool holder.
Figure 13:
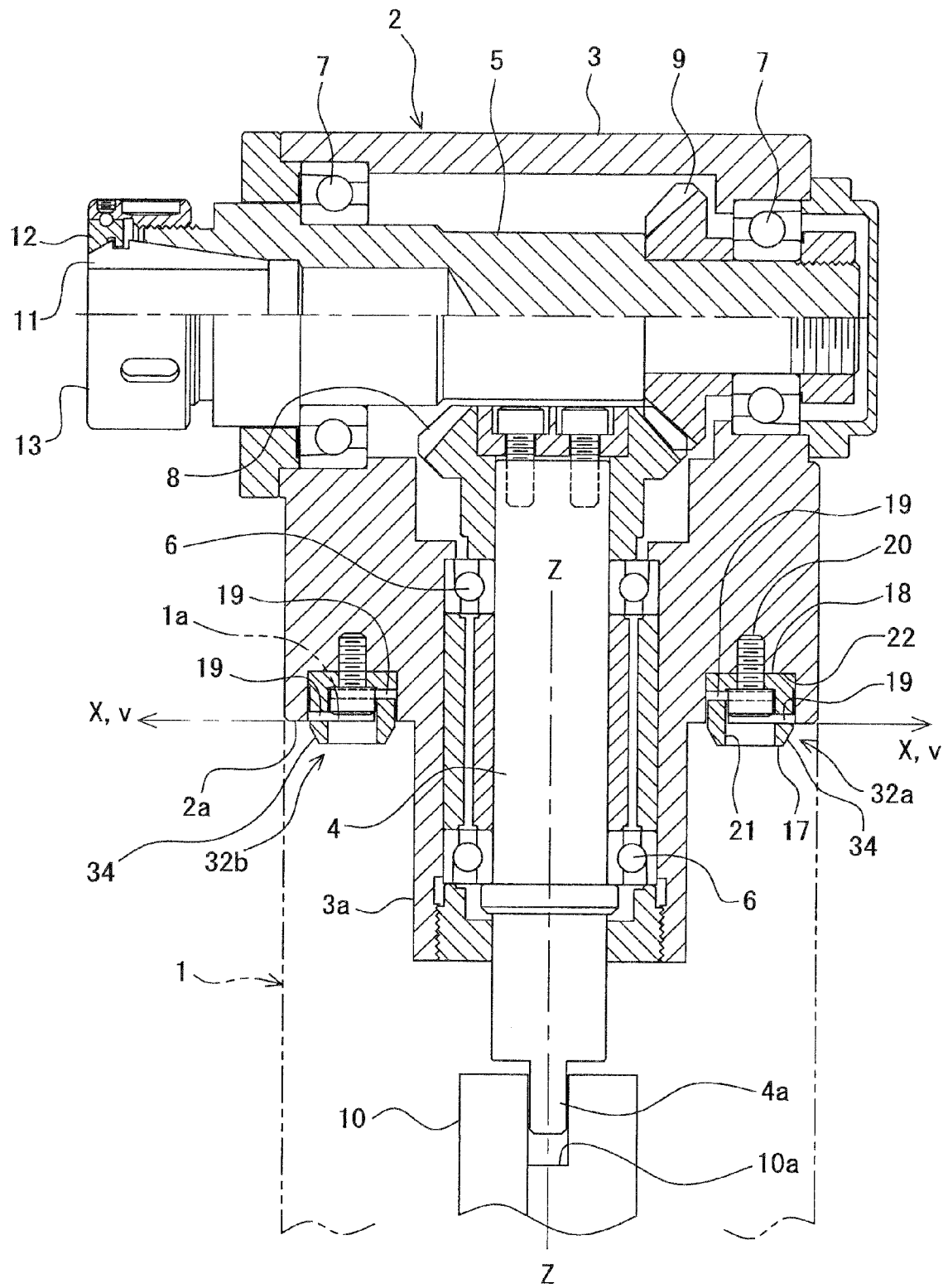
FIG. 13 is a sectional view taken along the line XIII-XIII in FIG. 12.

The coupling member 27 is, as shown in FIGS. 11A and 11B, an annular member such as a ring, for example, having rigidity. The protruded portions 16a, 16b, 16c described with reference to the first embodiment are integrally formed on this ring or secured thereto by means of adhesive.

Figure 9:
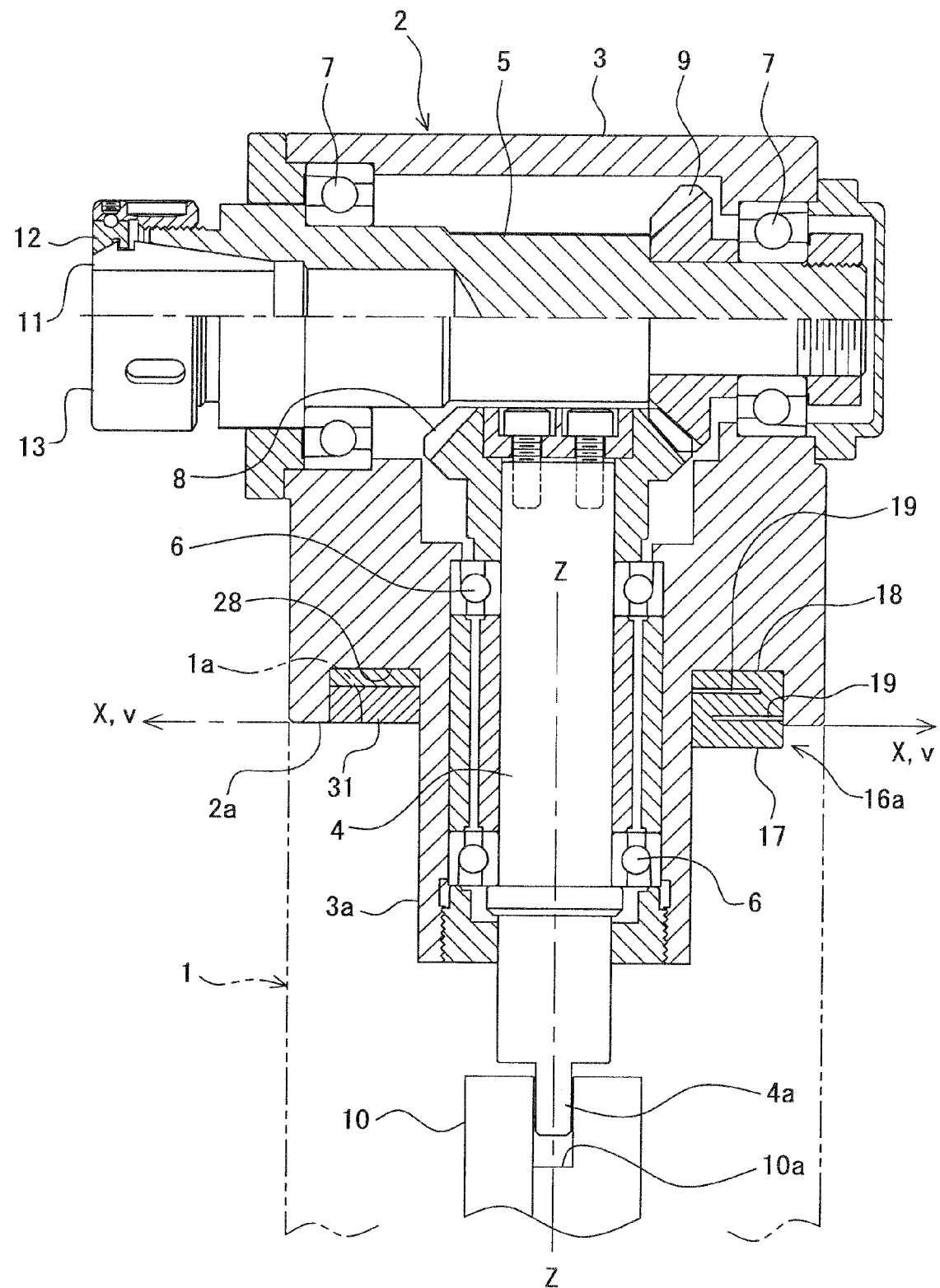
FIG. 9 is a sectional view taken along the line IX-IX in FIG. 8.
Figure 10:
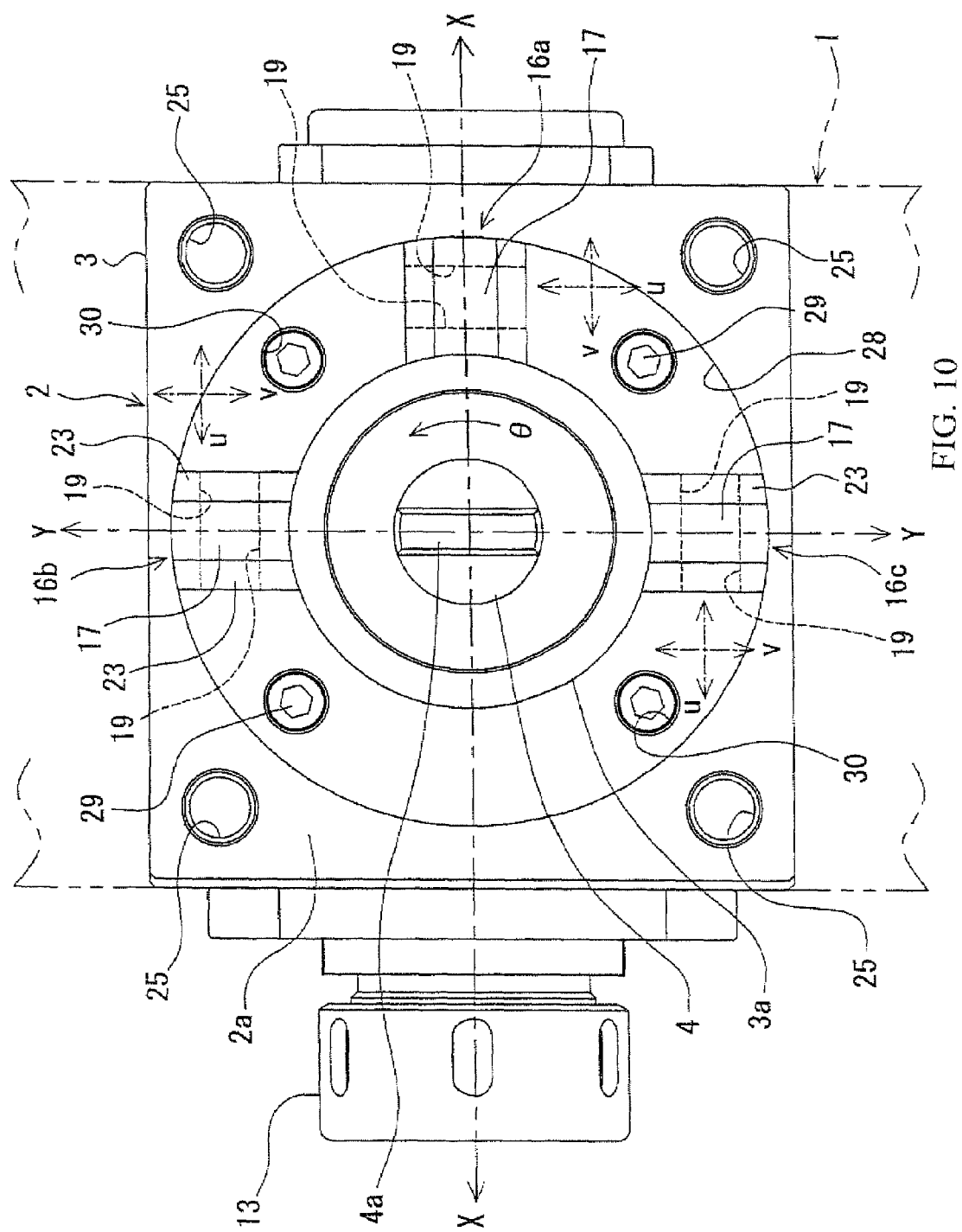
FIG. 10 is a bottom-side view of the tool holder positioning device when viewed from the bottom side of the tool holder.

As shown in FIGS. 9 and 10, the coupling member 27 has a shape such that the shank portion 3a of the tool holder 2 can penetrate the center portion of the coupling member 27, is fitted into an annular groove 28 formed to the housing of the tool holder so as to surround the shank portion 3a, and is fixed by means of bolt 29 shown in FIG. 10. In FIG. 11A, reference numeral 30 denotes a hole formed to the coupling member 29 so as to pass the bolt 29 therethrough.

The protruded portions 16a, 16b, 16c are protruded from the coupling surface 2a of the tool holder 2, by fixing the coupling member 27 to the housing 3 of the tool holder 2, to be parallel with the Z-axis in the same position and attitude as those in the first embodiment.

Furthermore, as shown in FIGS. 10, 11A and 11B, spacers 31, each in form of sector, are inserted between the protruded portions 16a, 16b, 16c on the coupling member 27 as occasion demands and are fixed to the tool holder side together with the coupling member 27 by means of the bolts 29. The respective spacers 31 are mounted to both side surfaces parallel with the v-w axis of the protruded portions 16a, 16b, 16c so that the end surfaces thereof cover openings of the slots 19.

According to this arrangement, when the respective protruded portions 16a, 16b, 16c are fitted into the recessed portions 15a, 15b and then compressed, the protruded portions 16a, 16b, 16c are elastically deformed to be parallel in the w-direction, i.e., Z-axis direction. Thus, the X- and Y-axes perpendicular to each other as intersecting axes included in the coupling surface 2a of the tool holder 2 smoothly accord with the X- and Y-axes perpendicular to each other as intersecting axes included in the desired seating surface 1a of the turret 1.

Further, in this second embodiment, like reference numerals are added to portions or members corresponding to those mentioned with reference to the first embodiment, and duplicated description is omitted herein.

Third Embodiment

FIGS. 12 to 15 represent a third embodiment, and in a tool holder positioning device of this embodiment, protruded portions 32a, 32b each formed so as to provide a circular-truncated cone shape having tapered outer peripheral surface 34. The protruded portions 32a, 32b are provided with slots 19 as in the first and second embodiments.

Figure 14:
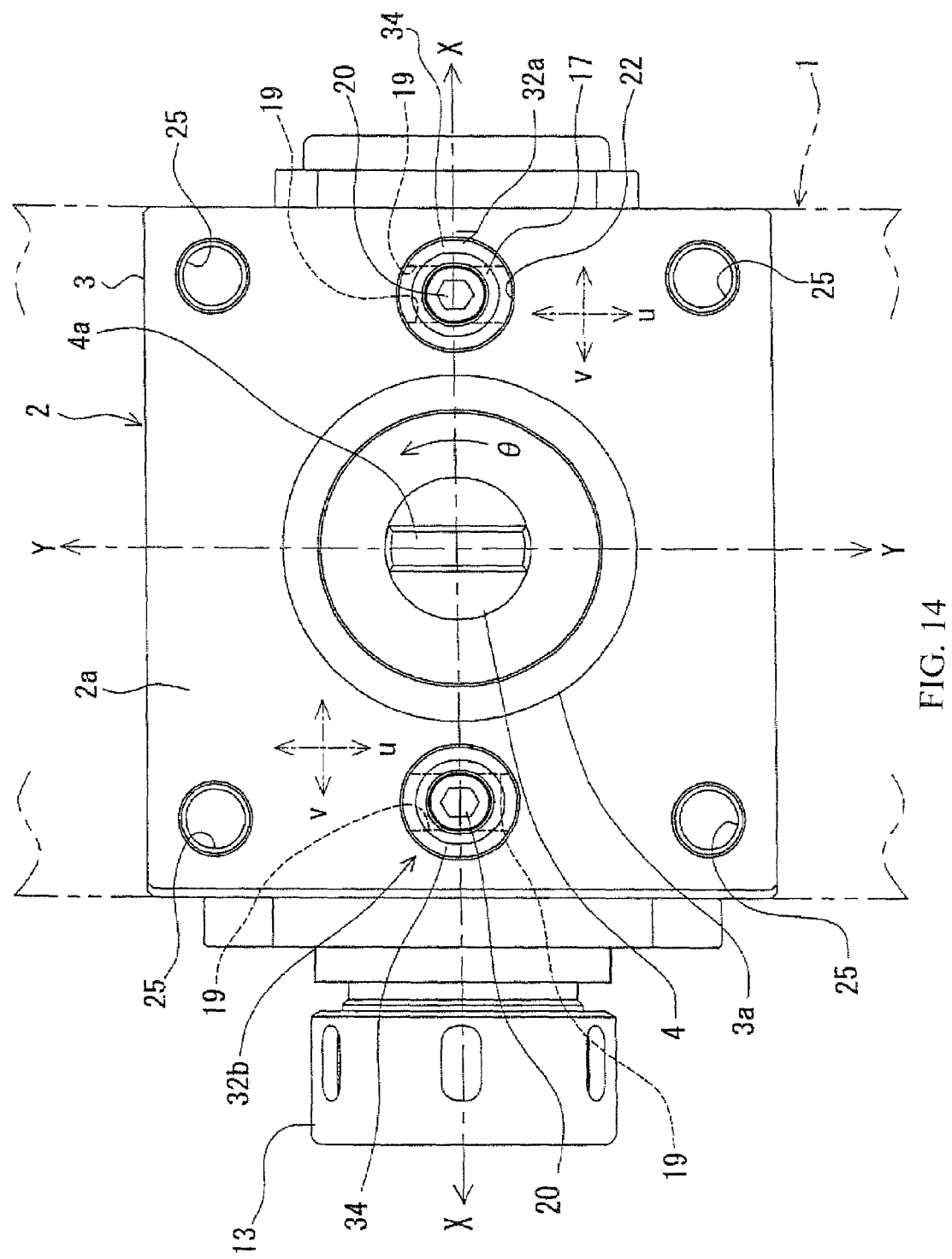
FIG. 14 is a bottom-side view of the tool holder positioning device when viewed from the bottom side of the tool holder.

As shown in FIG. 14, two protruded portions 32a, 32b are disposed on the X-axis included in the coupling surface 2a of the tool holder 2, and of course, they may be disposed respectively on the Y-axis or one or two protruded portions may be disposed on the X- and Y-axes intersecting at right angle.

Figure 15:
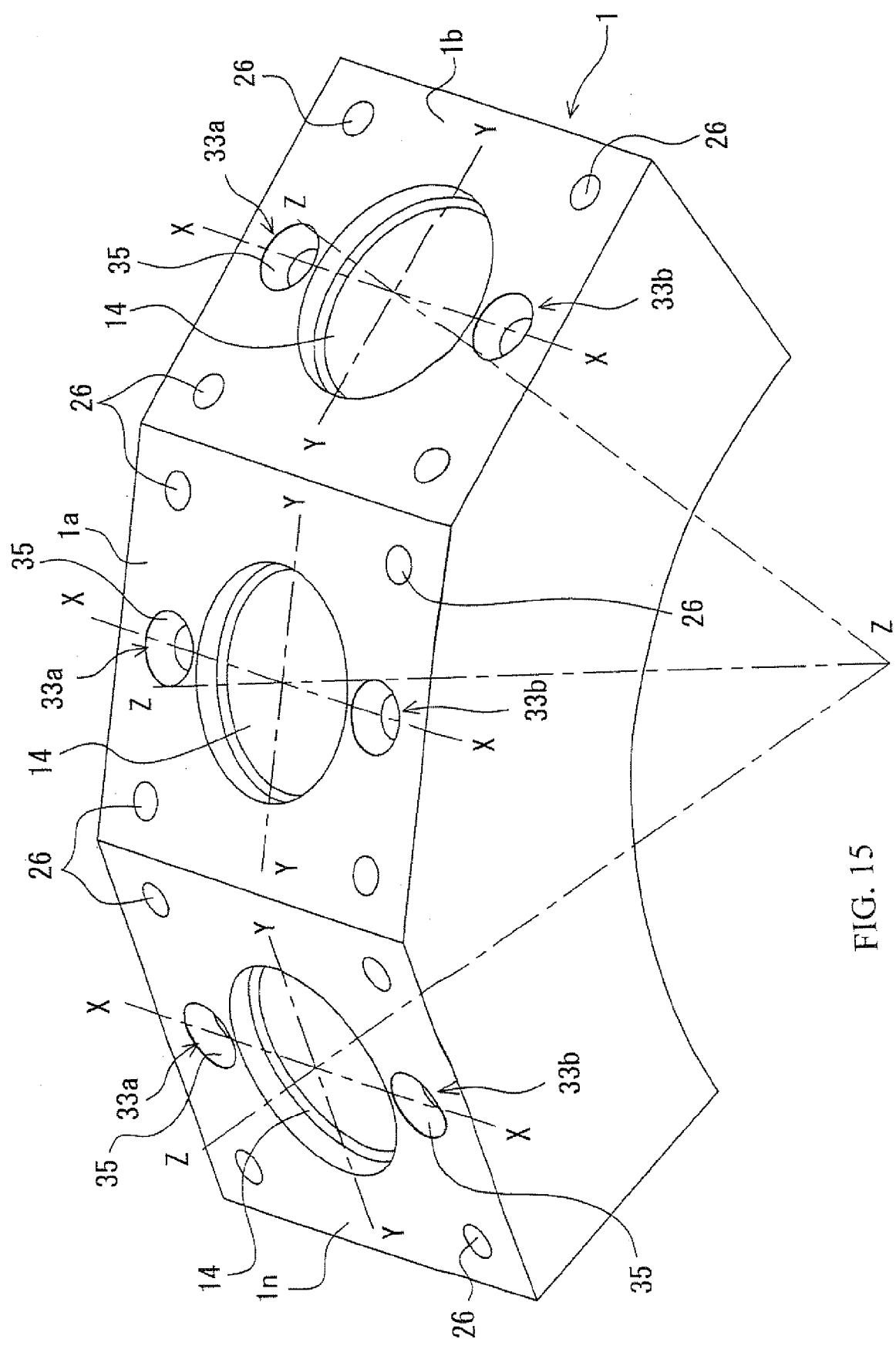
FIG. 15 is a partially cut-away perspective view of a turret to which the tool holder shown in FIG. 12 is fitted.

Further, as shown in FIG. 15, recessed portions 33a, 33b are formed as bowl-shaped female hole so as to provide shapes corresponding to shapes of the protruded portions 32a, 32b, and an inner peripheral surface of the recessed portion 33a (33b) has a tapered surface 35 corresponding to a tapered surface 34 of the protruded portion 32a (32b). The female holes are formed on the X- and Y-axes intersecting at right angle included in the seating surfaces 1a, 1b, - - -, 1n so as to correspond to the protruded portions 32a, 32b on the coupling surface 2a of the tool holder 2. In place of this female hole, a groove may be formed as in the first and second embodiments.

When the shank portion 3a of the tool holder 2 is inserted into the insertion hole 14 of the desired seating surface 1a, 1b, - - - or 1n of the turret 1, the coupling surface 2a of the tool holder 2 corresponds to the desired seating surface 1a, 1b, - - - or 1n of the turret 1, and the protruded portions 32a, 32b protruded from the coupling surface 2a are inserted into the recessed portions 33a, 33b of the seating surfaces 1a, 1b, - - -, 1n, as like shown in FIGS. 7B and 7C.

The tapered surfaces 35 and 34 of the recessed portions and the protruded portions 33a, 33b and 32a, 32b are contacted to each other and the protruded portions 32a, 32b are compressed in the recessed portions 33a, 33b, so that all the protruded portions 32a, 32b are linearly elastically deformed in the w-direction parallel to the Z-axis direction with respect to the coupling surface 2a and the corresponding seating surfaces 1a, 1b, - - -, 1n.

Therefore, the conical tapered surfaces 34 of the protruded portions 32a, 32b smoothly contact the corresponding tapered surfaces 35 of the recessed portions 33a, 33b, and the coupling surface 2a is smoothly moved in parallel with the Z-axis direction without swinging in a direction perpendicular to the Z-axis direction with respect to the corresponding seating surface 1a, 1b, - - - or 1n and is tightly and precisely contacted to the desired seating surface 1a, 1b, - - - or 1n. Accordingly, the tool holder 2 can be positioned with respect to the turret 1 with high precision.

Further, in this third embodiment, like reference numerals are added to portions or members corresponding to those mentioned with reference to the first and second embodiments, and duplicated description is omitted herein.

Fourth Embodiment

Figure 16:
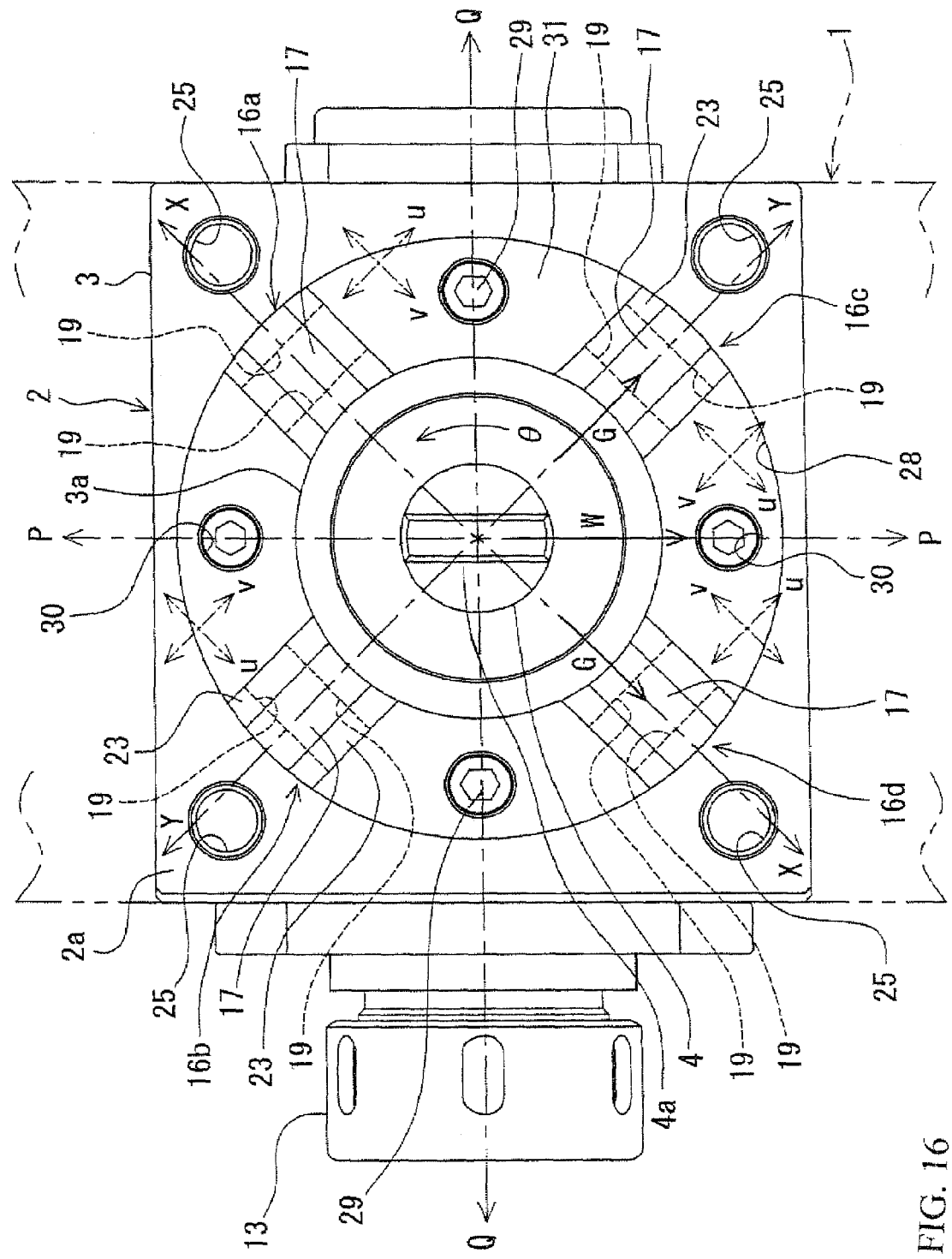
FIG. 16 is a bottom-side view of a tool holder positioning device according to a fourth embodiment of the present invention when viewed from a bottom side of a tool holder.
Figure 17:
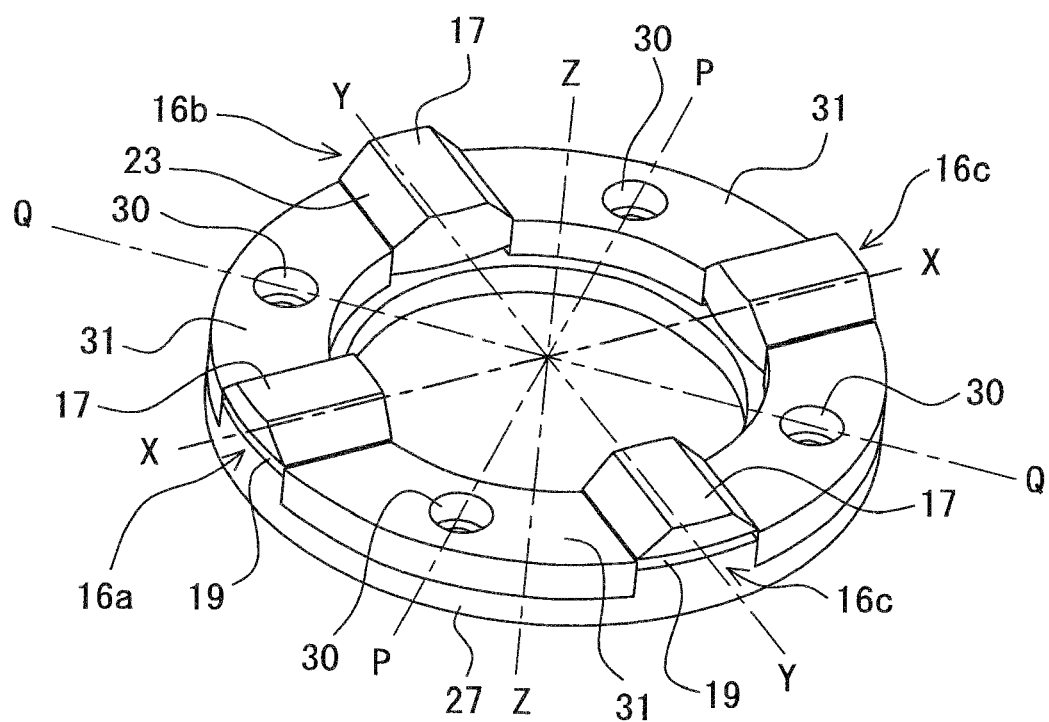
FIG. 17 is a perspective view showing the connecting portion on which a plurality of protruded portions are formed.

FIGS. 16 and 17 represent a fourth embodiment, in which four protruded portions 16a, 16b, 16c, 16d are provided, and all the protruded portions are integrated with the coupling member 27 as an annular member.

The coupling member 27 is formed as a ring having a rigidity as like as that of the second embodiment, as shown in FIG. 17. On this ring, three protruded portions 16a, 16b, 16c of the second embodiment and further one protruded portion 16d are formed integrally with the ring or fixed to the ring by means of adhesive or the like.

As shown in FIG. 16, the annular member as the coupling member 27 has a central hole having a size through which the shank portion 3a of the tool holder 2 can penetrate. The annular member is fitted into the annular groove 28 formed to the housing 3 of the tool holder 2 so as to surround the shank portion 3a, and is fixed to the housing 3 by means of bolts 29. In FIG. 17, reference numeral 30 denotes a hole formed to the coupling member 27 through which the bolt 29 passes.

The protruded portions 16a, 16b, 16c, 16d protrude from the coupling surface 2a of the tool holder in parallel with the Z-axis in the same position and attitude as those in the second embodiment.

Further, as shown in FIGS. 16 and 17, spacers 31, each in shape of sector, are inserted, as occasion demands, between the protruded portions 16a, 16b, 16c, 16d on the coupling member 27 and fixed to the tool holder 2 side by means of bolts 29 together with the coupling member 27. The spacers 31 are provided to both the side surfaces parallel with the v-w axis of the protruded portions 16a, 16b, 16c, 16d so as to cover the openings of the slot 19. According to such structure, when the respective protruded portions 16a, 16b, 16c, 16d are compressed in the recessed portions 15a, 15b, 15c, 15d, they are elastically deformed to be parallel in the w-direction, i.e., Z-axis.

Figure 18:
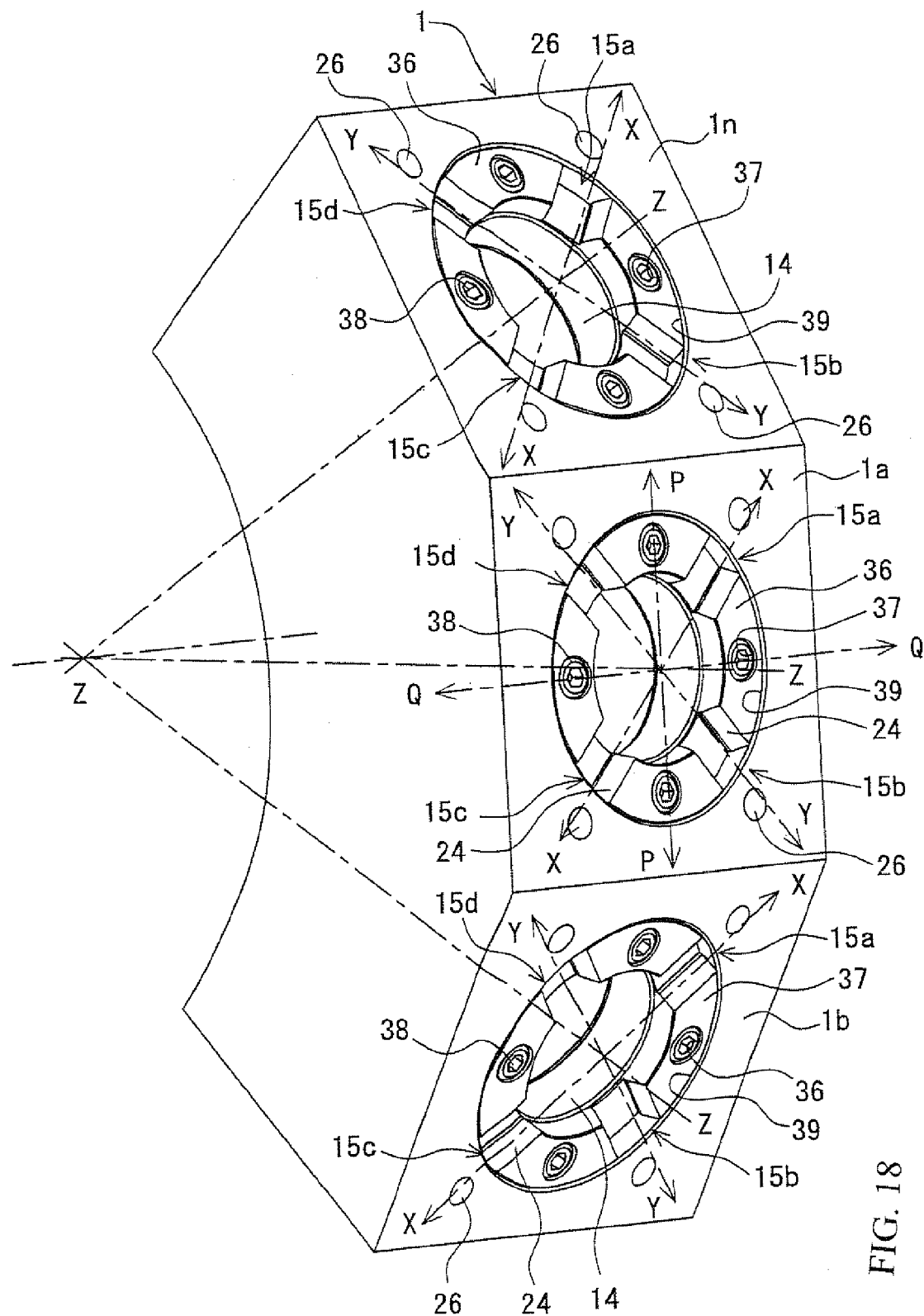
FIG. 18 is a partially cut-away perspective view of the turret.

Further, as shown in FIG. 18, four recessed portions 15a, 15b, 15c, 15d are formed in the respective seating surfaces 1a, 1b, - - -, 1n of the turret 1, and all the recessed portions 15a, 15b, 15c, 15d are integrally formed with the coupling member 36 as the annular member.

The coupling member 36 is formed as, for example, a ring member having a rigidity like the coupling member 27 on the side of the tool holder 2. The recessed portions 15a, 15b, 15c, 15d are integrally formed on the one end surface of this ring member.

As shown in FIG. 18, the coupling member 36 has a central hole portion having a size capable of penetrating the shank portion 3a of the toll holder 2. The coupling member 36 is fitted into the annular groove 39 formed to each recessed portions 1a, 1b, - - - , 1n of the turret 1 so as to surround the shank portion 3a, and is then fixed to the turret 1 by means of bolt 38. In FIG. 18, reference numeral 37 denotes a hole formed to the coupling member 36 for passing the bolt 38.

The recessed portions 15a, 15b, 15c, 15d are depressed below the respective seating surfaces 1a, 1b, - - - , 1n by fixing the coupling member to the turret 1 as like as in the embodiment 2.

In this fourth embodiment, as shown in FIG. 16, the X-Y axes as intersecting axes included in the coupling surface 2a of the tool holder 2 is shifted in phase by 45 degrees from the position of the two X-Y axes in the first and second embodiments around Z-axis. As shown in FIG. 18, the X-Y axes as intersecting axes included in the seating surface 1a, 1b, - - - , 1n of the turret 1 are also shifted in phase.

According to such arrangement, when the turret 1 is turned in a perpendicular plane, as shown in FIG. 18, the desired seating surface 1a of the turret 1 provides a vertical surface, and the coupling surface 2a of the tool holder 2 also provides a vertical surface as shown in FIG. 16, the X-Y axes intersecting at right angle intersect the perpendicular axis P or horizontal axis Q at an angle of 45 degrees.

Figure 19:
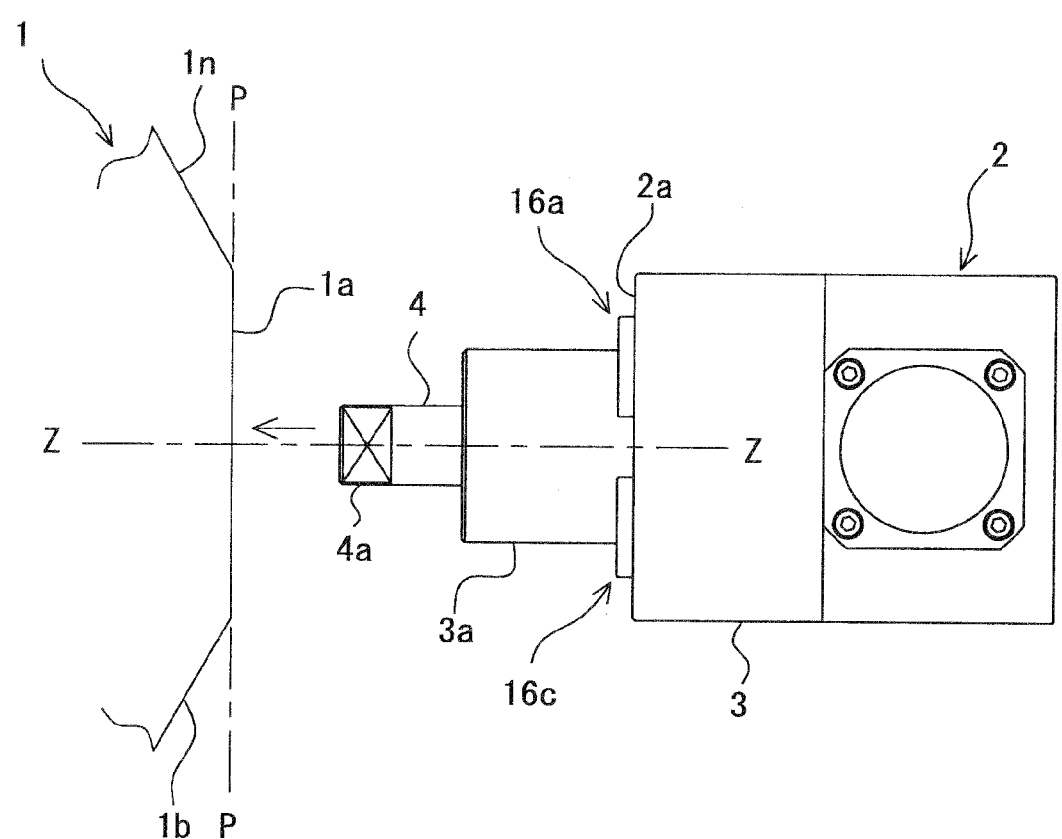
FIG. 19 is a view for explaining a working for mounting the tool holder to the seating surface as a vertical surface of the turret.

Because of the reason mentioned above, as shown in FIG. 19, when the tool holder 2 is mounted to the seating surface 1a as the vertical surface of the turret 1 by inserting it in the horizontal direction, as shown in FIG. 16, the weight W of the tool holder 2 is shared to the respective protruded portions 16c, 16d and the recessed portions 15c, 15d, disposed so as to snap the perpendicular axis P, so that the mounting performance of the tool holder 2 can be improved. In FIG. 16, reference characters G, G denote forces generated in the X-Y axes by the sharing of the weight W in two directions. Such configuration is advantageous particularly in the case of large weight W of the tool holder 2.

Further, in this fourth embodiment, fastening bolts, not shown, for fastening the tool holder 2 to the seating surfaces 1a, 1b, - - - , 1n of the turret 1 and insertion holes 25 and screw holes 26 are provided on the X-Y axes as intersecting axes or in the vicinity thereof.

According to such arrangement, the protruded portions 16a, 16b, 16c, 16d can be more precisely deformed in the vertical direction with respect to the seating surface 1a or coupling surface 2a, and the mounting performance of the tool holder 2 with respect to the seating surfaces 1a, 1b, - - - , 1n of the turret 1 can be accurately improved.

Further, in this fourth embodiment, like reference numerals are added to members or portions corresponding to those described with reference to the first and second embodiments, and the duplicated description is omitted herein.

Fifth Embodiment

Figure 20:
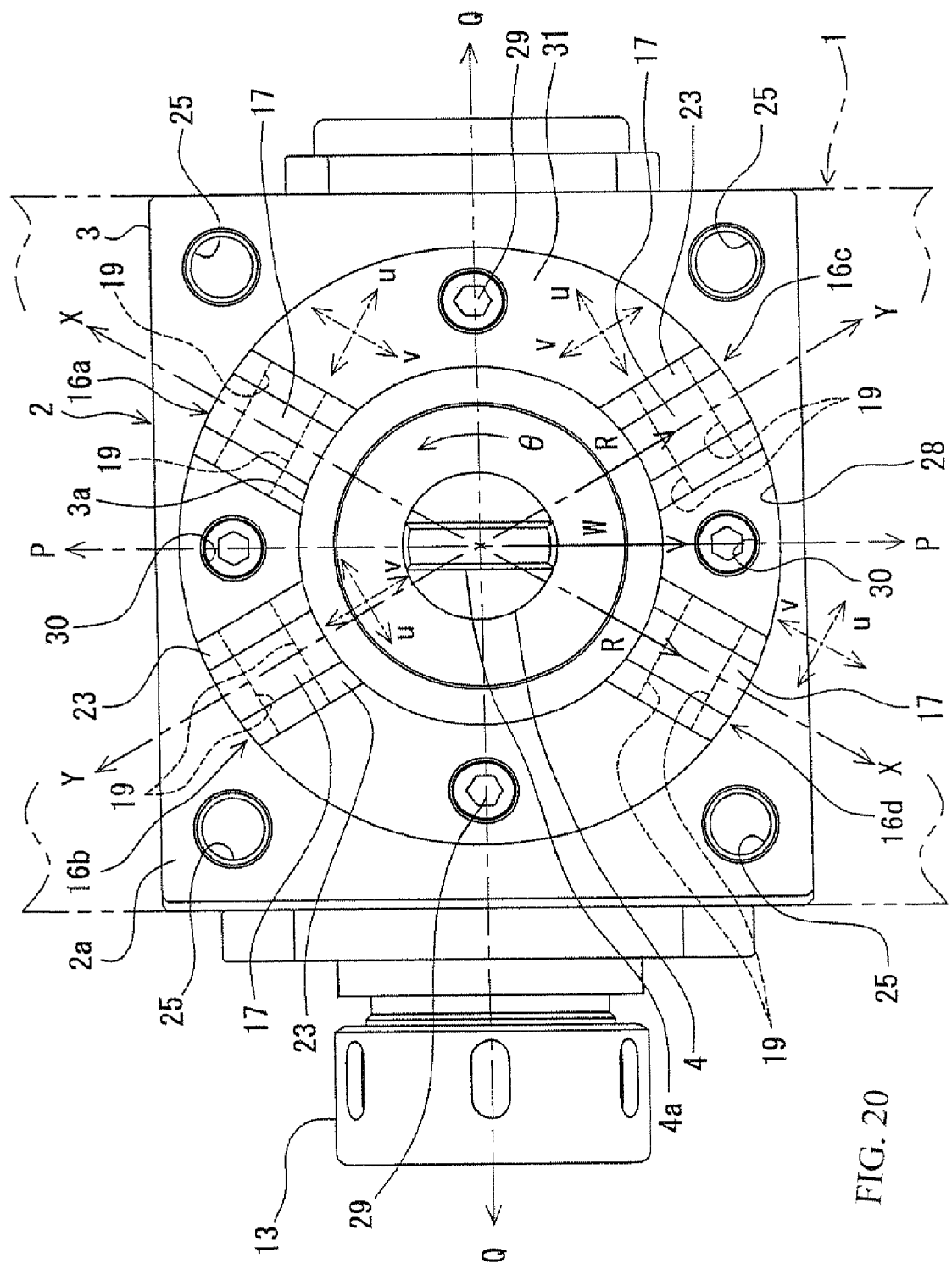
FIG. 20 is a bottom-side view of a tool holder positioning device according to a fifth embodiment of the present invention when viewed from a bottom side of a tool holder.

As shown in FIG. 20, in this fifth embodiment, the X-Y axes as the intersecting axes on the coupling surface 2a of the tool holder 2 are intersected at an intersecting angle of 60 degrees. Further, though not shown, the X-Y axes as the intersecting axes on the seating surfaces 1a, 1b, - - - , 1n of the turret 1 are also intersecting at the same angle. In this case, a force R generated in the X-Y axes direction by sharing the weight W of the tool holder 2 becomes larger than a force G in the case of the fourth embodiment.

Further, it is to be noted that the like reference numerals are added to members or portions corresponding to those of the fourth embodiment and the duplicated description is omitted herein.

In the above descriptions, although preferred embodiments of the present invention were explained, the present invention may be changed or modified without departing from the subject of the present invention. For example, although, in the first to fifth embodiments, the recessed portions are formed to the seating surfaces of the tool rest and the protruded portions are formed to the coupling surface of the tool holder, the recessed portions may be formed to the coupling surface to the tool holder and the protruded portions may be formed to the seating surface of the tool rest.

Furthermore, the recessed portions and the protruded portions may be also formed to the coupling surface and the protruded portions and the recessed portions may be formed to the seating surface of the tool rest. In addition, although the tool holder was described as one for holding a cutting tool so as to be turned such as drill bit, the present invention may be applied to a tool holder such as shank tool which holds the tool in a fixed manner.

Still furthermore, the X-Y axes may be intersected at desired angle other than 90 degrees or 60 degrees, and an intersecting angle between the perpendicular axis of the X-Y axes or horizontal axis and the X-Y axes may be preferably selected.

What is claimed is:

1. A tool holder positioning device which includes: a plurality of protruded portions or a plurality of recessed portions formed to a seating surface of a tool rest; and a plurality of recessed portions or a plurality of protruded portions formed to a coupling surface of a tool holder so as to correspond, respectively, to a plurality of protruded portions or a plurality of recessed portions formed to the seating surface of the tool rest, when the seating surface and the coupling surface are contacted, and in which the protruded portions and the recessed portions have tapered surfaces which are symmetric with each other so as to slidably contact to each other when the seating surface and the coupling surface are tightly contacted, wherein at least one of the protruded portions and at least one of the recessed portions are disposed on an intersecting axis included in the seating surface, the recessed portions and the protruded portions to be fitted to the plurality of protruded portions and the plurality of recessed portions are disposed on an intersecting axis included in the coupling surface, a plurality of slots parallel with the seating surface or coupling surface are alternatively formed in a direction of an axis on which the protruded portions are disposed so that the protruded portions are elastically deformable in a vertical direction with respect to the seating surface or coupling surface, and the tapered surfaces of the recessed portions and the protruded portions are symmetric with respect to the axes on which the respective recessed portions and the protruded portions are disposed.

2. The tool holder positioning device according to claim 1, wherein each of the protruded portions has substantially cubic shape or rectangular parallelepiped shape.

3. The tool holder positioning device according to claim 1, wherein each of the protruded portions has a circular-truncated cone shape.

4. The tool holder positioning device according to claim 1, wherein all the protruded portions are coupled integrally by a coupling member.

5. The tool holder positioning device according to claim 1, wherein the recessed portions are grooves extending along the respective axes.

6. The tool holder positioning device according to claim 1, wherein each of the recessed portions is a female hole which is fitted to the corresponding protruded portion.

7. The tool holder positioning device according to claim 1, wherein the intersecting axes are two axes intersecting at right angle.

8. The tool holder positioning device according to claim 1, wherein the intersecting axes intersect a perpendicular axis or horizontal axis included in the seating surface or coupling surface.

9. The tool holder positioning device according to claim 1, wherein a fastening bolt for fastening the tool holder to the seating surface of the tool rest is disposed on or near the intersecting axes.

10. The tool holder positioning device according to claim 1, wherein all the protruded portions and recessed portions are formed as annular members, and the annular members are fitted into and fixed to annular grooves formed respectively to the seating surfaces or coupling surface so as to surround the tool holder.

* * * * *